(12) United States Patent
Austrheim

(10) Patent No.: US 12,240,695 B2
(45) Date of Patent: Mar. 4, 2025

(54) STORAGE SYSTEM

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 566 days.

(21) Appl. No.: 17/432,436

(22) PCT Filed: Jan. 20, 2020

(86) PCT No.: PCT/EP2020/051272
§ 371 (c)(1),
(2) Date: Aug. 19, 2021

(87) PCT Pub. No.: WO2020/169287
PCT Pub. Date: Aug. 27, 2020

(65) Prior Publication Data
US 2022/0144543 A1    May 12, 2022

(30) Foreign Application Priority Data

Feb. 19, 2019 (NO) .................................... 20190224
Dec. 9, 2019 (NO) .................................... 20191456

(51) Int. Cl.
*B65G 1/04* (2006.01)
*B60L 53/16* (2019.01)
*B60L 53/36* (2019.01)

(52) U.S. Cl.
CPC ............ *B65G 1/0464* (2013.01); *B60L 53/16* (2019.02); *B60L 53/36* (2019.02); *B65G 1/0478* (2013.01);
(Continued)

(58) Field of Classification Search
CPC ........ B65G 1/0464; B60L 53/36; B60L 53/35
See application file for complete search history.

(56) References Cited

U.S. PATENT DOCUMENTS 5,617,003 A * 4/1997 Odachi ................... B60L 53/35
320/108
9,371,184 B1    6/2016 Dingle et al.
(Continued)

FOREIGN PATENT DOCUMENTS

CH        688598 A5    11/1997
CN     101209552 A     7/2008
(Continued)

OTHER PUBLICATIONS

Office Action issued in Chinese Application No. 202080015253X mailed on Jul. 13, 2022 (13 pages).
(Continued)

*Primary Examiner* — Jonathan Snelting
(74) *Attorney, Agent, or Firm* — Baker Botts L.L.P.

(57) ABSTRACT

A storage system includes at least one vehicle, a horizontal rail grid, and a charging system for charging a rechargeable power source of the vehicle. The vehicle includes a first set of wheels and a second set of wheels for moving the vehicle upon the rail grid. The first set of wheels is displaceable in a vertical direction between a first position, a second position, and a third position. The first set of wheels may move the vehicle in a first direction. The first and the second set of wheels are in contact with the rail grid. The second set of wheels may move the vehicle in a second direction perpendicular to the first direction. The charging system includes at least two charge-receiving elements arranged on the vehicle and connected to the power source, and a charging station including two charge-providing elements connected to a charging power source. The charging station includes an actuator operatively connected to the charge-providing elements and arranged to move the charge-providing elements in a vertical direction, such that the charge-receiving ele-
(Continued)

ments may be connected with the charge-providing elements when the vehicle is positioned above the charging station.

11 Claims, 24 Drawing Sheets

(52) U.S. Cl.
CPC ........ *B65G 1/0492* (2013.01); *B60L 2200/26* (2013.01); *B60L 2200/36* (2013.01)

(56) References Cited

U.S. PATENT DOCUMENTS

| | | | |
|---|---|---|---|
| 10,000,337 B2 * | 6/2018 | Lindbo | .................. G06Q 10/08 |
| 10,017,062 B2 * | 7/2018 | Kufner | .................... B60L 53/30 |
| 10,286,799 B2 * | 5/2019 | Namou | .................... B60L 53/30 |
| 2014/0277689 A1 | 9/2014 | Salichs | |
| 2014/0311858 A1 | 10/2014 | Keating et al. | |

FOREIGN PATENT DOCUMENTS

| | | |
|---|---|---|
| CN | 204250735 U | 4/2015 |
| CN | 105151617 A | 12/2015 |
| CN | 107444823 A | 12/2017 |
| CN | 108910382 A | 11/2018 |
| DE | 102009010120 A1 | 9/2010 |
| DE | 102011051646 A1 | 1/2013 |
| JP | S48-039680 U | 5/1973 |
| JP | S51-001905 U | 1/1976 |
| JP | H01098476 U | 6/1989 |
| JP | 2015142442 A | 8/2015 |
| JP | 2017503731 A | 2/2017 |
| NO | 317366 B1 | 10/2004 |
| WO | 2005077789 A1 | 8/2005 |
| WO | 2012/127419 A1 | 9/2012 |
| WO | 2014090684 A1 | 6/2014 |
| WO | 2015104263 A2 | 7/2015 |
| WO | 2015/140216 A1 | 9/2015 |
| WO | 2015193278 A1 | 12/2015 |
| WO | 2017/220627 A1 | 12/2017 |

OTHER PUBLICATIONS

International Search Report issued in PCT/EP2020/051272 on Apr. 29, 2020 (5 pages).
Written Opinion of the International Searching Authority issued in PCT/EP2020/051272 on Apr. 29, 2020 (12 pages).
Norwegian Search Report issued in NO 20190224 mailed on Sep. 19, 2019 (2 pages).
Norwegian Search Report issued in NO 20191456 mailed on Sep. 17, 2020 (2 pages).
English translation of Office Action issued in Japanese Application No. 2021-547849; Dated Dec. 21, 2023 (4 pages).
Office Action issued in Japanese Application No. 2021-547849, dated May 31, 2024, 4 pages (with translation).
Olav Bergheim, Office Action in Norwegian patent application No. 20191456, Norwegian Industrial Property Office, mailed Sep. 17, 2020, 4 pages.
Olav Bergheim, Office Action in Norwegian patent application No. 20191456, Norwegian Industrial Property Office, mailed Sep. 24, 2020, 2 pages.
Hildegunn Skagen, Approval fro Grant of Patent in Norwegian patent application No. 20191456, Norwegian Industrial Property Office, mailed Oct. 7, 2020, 2 pages.
Rudi Hoffert, Examination communication in European patent application No. 20 702 234.4, European Patent Office, mailed Dec. 13, 2023, 2 pages.

* cited by examiner

Fig. 12 (Detail A)

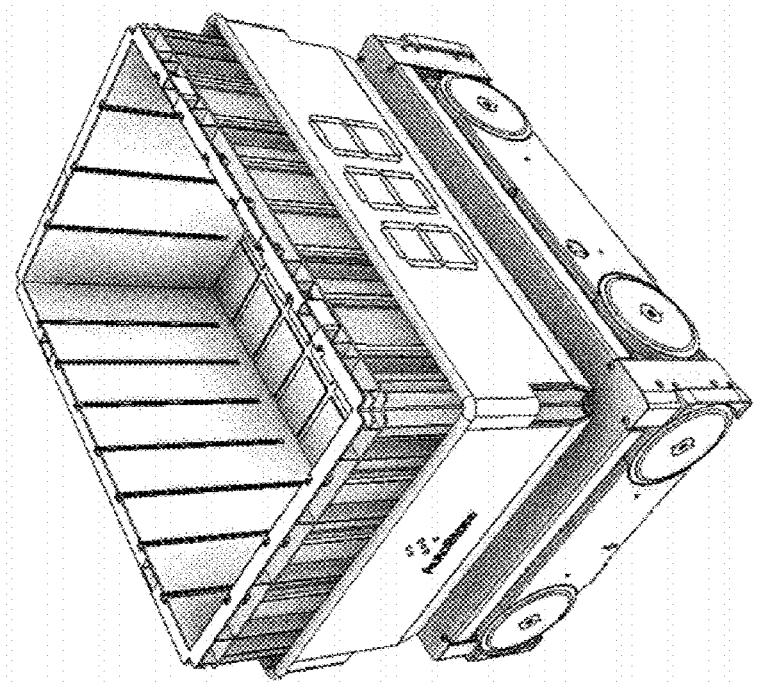
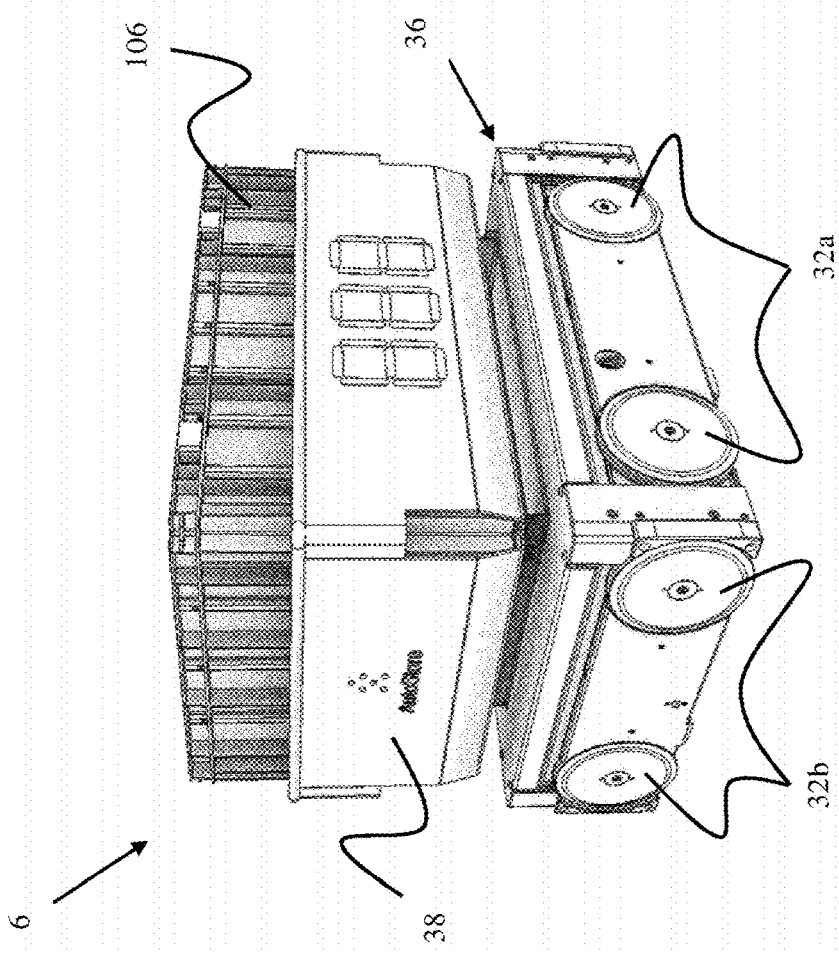
Fig. 14A
Fig. 14B

STORAGE SYSTEM

FIELD OF THE INVENTION

The present invention relates to an automated storage and retrieval system comprising a charging system, and a method of using the automated storage and retrieval system.

BACKGROUND

FIGS. 1A and 2B disclose a typical prior art automated storage and retrieval system 1 with a framework structure 100. FIGS. 1B and 2B disclose prior art container-handling vehicles 200,300 operating in the system 1 disclosed in FIGS. 1A and 2A, respectively.

The framework structure 100 defines a storage grid 104 comprising a plurality of upright members 102 and optionally a plurality of horizontal members 103 supporting the upright members 102. The members 102, 103 may typically be made of metal, e.g. extruded aluminium profiles.

The storage grid 104 comprises multiple grid columns 112. A large majority of the grid columns are also termed storage columns 105, in which storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the of storage containers 106 in the stacks 107, and guides vertical movement of the containers 106, but does normally not otherwise support the storage containers 106 when stacked.

The automated storage and retrieval system 1 comprises a rail system 108 (or a top rail grid) arranged in a grid pattern across the top of the storage grid 104, on which rail system 108 a plurality of container-handling vehicles 200,300 (as exemplified in FIGS. 1B and 2B) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 2A marked with thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container-handling vehicles 200,300 in a first direction X across the top of the frame structure 100, and a second set of parallel rails 111 arranged perpendicular to the first set of rails 110 to guide movement of the container-handling vehicles 200,300 in a second direction Y which is perpendicular to the first direction X. In this way, the rail system 108 defines the upper ends of the grid columns 112 above which the container-handling vehicles 200,300 can move laterally, i.e. in a plane which is parallel to the horizontal X-Y plane. Commonly, at least one of the sets of rails 110,111 is made up of dual-track rails allowing two container-handling vehicles to pass each other on neighbouring grid cells 122. Dual-track rails are well-known and disclosed in for instance WO 2015/193278 A1 and WO 2015/140216 A1, the contents of which are incorporated herein by reference.

Each prior art container-handling vehicle 200,300 comprises a vehicle body and a wheel arrangement of eight wheels 201,301, wherein a first set of four wheels enable the lateral movement of the container-handling vehicles 200, 300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container-handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and for the purpose of this application, Z=1 identifies the uppermost layer of the grid 104, i.e. the layer immediately below the rail system 108, Z=2 the second layer below the rail system 108, Z=3 the third layer etc. In the prior art storage grid disclosed in FIGS. 1A and 2A, Z=8 identifies the lowermost, bottom layer of the grid 104. Consequently, as an example, and using the Cartesian coordinate system X, Y, Z indicated in FIGS. 1A and 2B, the storage container identified as 106' in FIG. 1 can be said to occupy grid location or cell X=10, Y=2, Z=3. The container-handling vehicles 200,300 can be said to travel in layer Z=0 and each grid column can be identified by its X and Y coordinates.

Each container-handling vehicle 200 comprises a storage compartment or space (not shown) for receiving and stowing a storage container 106 when transporting the storage container 106 across the top of the storage grid 104. The storage space may comprise a cavity arranged centrally within the vehicle body, e.g. as is described in WO2014/090684A1, the contents of which are incorporated herein by reference.

Alternatively, the container-handling vehicles 300 may have a cantilever construction as described in NO317366, the contents of which are also incorporated herein by reference.

The container-handling vehicles 200 may have a footprint, i.e. an extent in the X and Y directions, which is generally equal to the horizontal area of a grid cell 122, i.e. the extent of a grid cell 122 in the X and Y directions, e.g. as is described in WO2015/193278A1, the contents of which are incorporated herein by reference.

Alternatively, the container-handling vehicles 200 may have a footprint which is larger than the horizontal area of a grid cell 122, e.g. as is disclosed in WO2014/090684A1.

The prior art container-handling vehicles comprises a rechargeable battery for driving the vehicle and operating the lifting device. The battery of the container-handling vehicle is recharged at a charging station (not shown). Commonly, the vehicle and the charging station features a plug/pin and socket interface. A plug/pin 27 for coupling to a socket of a charging station is shown on the prior art container-handling vehicle 300 in FIG. 2. The battery of the prior art container-handling vehicle 300 is recharged by moving the vehicle towards the charging station, such that the plug/pin 27 is inserted into a corresponding socket on the charging station. When the battery is charged, the vehicle is moved away from the charging station to disconnect the plug/pin from the socket. Charging systems, wherein the container-handling vehicle features a replaceable and rechargeable battery are known and disclosed in for instance WO 2015/104263 A2.

A common feature of the prior art charging stations/systems is the use of a charging interface featuring a plug/pin on the vehicle and a corresponding socket on the charging station (or vice versa). Such an interface requires a very high precision during connection and is vulnerable to wear. Further, the prior art interfaces requiring a horizontal coupling movement limit the practical charging current that may be employed. The reason for the current limitation is that an increased current requires a correspondingly larger plug/socket which increases the friction between the two parts of the interface and consequently the force required to connect/disconnect the plug/socket. The container-handling vehicle 300 may only provide a certain push/pull force in the horizontal plane limited by the friction between the wheels and the rails. Consequently, if the plug/socket is too large, the container-handling vehicle will not be able to connect/disconnect the plug/pin from the socket.

In view of the above, the aim of the present invention is to provide an automated storage and retrieval system, and a method for operating such a system, that solves or at least mitigates one or more of the problems related to the charging systems of the prior art storage and retrieval systems.

SUMMARY OF THE INVENTION

The present invention is defined by the appended claims and in the following:

In a first aspect, the present invention provides a storage system comprising at least one vehicle, a horizontal rail grid and a charging system for charging a rechargeable power source of the vehicle, wherein
   the vehicle comprises a first set of wheels and a second set of wheels for moving the container vehicle upon the rail grid;
   the first set of wheels is displaceable in a vertical direction between a first position, wherein the first set of wheels may move the vehicle in a first direction, a second position, wherein the first and the second set of wheels are in contact with the rail grid, and a third position wherein the second set of wheels may move the vehicle in a second direction perpendicular to the first direction;
   the charging system comprises at least two charge-receiving elements arranged on the vehicle and connected to the rechargeable power source, and a charging station comprising two charge-providing elements connected to a charging power source; wherein
the charging station comprises an actuator operatively connected to the charge-providing elements and arranged to move the charge-providing elements in a vertical direction, such that the charge-receiving elements may be connected with the charge-providing elements when the vehicle is positioned above the charging station.

In other words, the actuator is operatively connected such that the charge-providing elements may be moved into electric contact with the charge-receiving elements when the vehicle is positioned above the charging station.

In other words, the first set of wheels may be displaceable in a vertical direction relative to a vehicle body of the vehicle and relative to the second set of wheels. The first set of wheels may be arranged such that the vehicle body is lowered towards the rail grid when the first set of wheels is displaced from the first to the second or third position. In other words, the first set of wheels may be arranged such that the vehicle body is lowered towards the charging station when the first set of wheels is displaced from the first to the second or third position.

In an embodiment of the storage system, the actuator is arranged to move the charge-providing elements between a first position in which the charge-receiving elements and the charge-providing elements may be connected and a second position in which the charge-receiving elements and the charge-providing elements are separated, i.e. are vertically separated.

In other words, when the vehicle is positioned above the charging station, the charge-providing elements may be moved between a first position, in which the charge-providing elements are in contact, and a second position in which the charge-receiving elements and the charge-providing elements are vertically separated.

In an embodiment of the storage system, the charge-receiving elements and the charge-providing elements are connected when the vehicle is positioned above the charging station, and the charge-providing elements are in the first position.

In an embodiment of the storage system, the actuator is arranged such that an upper level of the charge-providing elements is at or below an upper level of the rail grid when the charge-providing elements are in the second position and above the upper level of the rail grid when the charge-providing elements are in the first position.

In other words, an uppermost part of the charge-providing elements is at or below an uppermost level of the rail grid, i.e. an uppermost level of the rails making up the rail grid, when the charge-providing elements are in the second position and above the uppermost level of the rail grid when the charge-providing elements are in the first position. This feature is highly advantageous in providing a flexible use of the rail grid, since the vehicle may pass above the charging station unhindered when the charge-providing elements are in the second position.

In an embodiment of the storage system, the charge-receiving elements and the charge-providing elements are connected when the vehicle is positioned above the charging station, and the charge-providing elements are in the first position and the first set of wheels is in the second or third position.

In an embodiment of the storage system, the charge-receiving elements are at least one power socket and the charge-providing elements are at least two power pins.

The at least one power socket may feature a contact for each of the power pins. In other words, the charge-receiving elements may be a single power socket featuring a contact for each of the power pins or the charge-receiving elements may be at least two separate power sockets, wherein each power socket features a contact for one of the power pins.

In an embodiment, the storage system comprises three charge-receiving elements arranged on a bottom section of the vehicle, of which a first charge-receiving element is centrally arranged on the bottom section and a second charge-receiving element and a third charge-receiving element are arranged on opposite sides of the first charge-receiving element, such that the two charge-providing elements may be connected to the first charge-receiving element and one of the second and third charge receiving elements depending upon the orientation in which the vehicle is arranged on the rail grid.

In an embodiment of the storage system the three charge-receiving elements are arranged in a line along the first or second direction. The three charge-receiving elements may be three separate power sockets.

In an embodiment of the storage system, the charging station is arranged within a grid cell of the rail grid, such that the vehicle may pass above the charging station unhindered when the charge-providing elements are in the second position.

In an embodiment of the storage system, the charging station may comprise a support structure, the support structure may be arranged within a single grid cell of the rail grid and at a level below an upper level of the rails of the rail grid. An advantage of having the support structure arranged within a single grid cell of the rail grid and at a level below the rails of the rail grid is that the charging station may be arranged anywhere on the rail grid without preventing movement of the vehicle.

In an embodiment of the storage system, the two charge-providing elements provide a direct current, i.e. one of the charge-providing elements is DC- and the other DC+.

In an embodiment of the storage system, the rechargeable power source may be a battery or a capacitor.

In an embodiment, the storage system may comprise a storage grid structure having vertical column profiles defining multiple storage columns, in which storage containers can be stored one on top of another in vertical stacks. The column profiles may be interconnected at their upper ends by top rails forming a horizontal top rail grid.

In an embodiment, the storage system comprises at least one horizontal transfer rail grid arranged at a level below the top rail grid.

In an embodiment of the storage system, the rail grid may be any of the top rail grid and the transfer rail grid.

In an embodiment of the storage system the rail grid is a transfer rail grid and the storage system may also be termed a transfer system.

In an embodiment of the storage system, the vehicle may be any of a container handling vehicle arranged to move upon the top rail grid and a container transfer vehicle arranged to move upon the transfer rail grid.

The at least one vehicle may be any vehicle suitable for a storage system, such as a container transfer vehicle, a container handling vehicle or a vehicle featuring a suitable wheel assembly.

In a second aspect, the present invention provides a vehicle for a storage system according to any embodiment of the first aspect, comprising a rechargeable power source, at least two charge-receiving elements for receiving electrical charging current, a first set of wheels and a second set of wheels, wherein
- the first set of wheels and the second set of wheels are for moving the vehicle upon a rail grid, and the first set of wheels is displaceable in a vertical direction between a first position, wherein the first set of wheels may move the vehicle in a first direction, a second position, wherein the first and the second set of wheels are in contact with the rail grid, and a third position wherein the second set of wheels may move the vehicle in a second direction perpendicular to the first direction;
- the rechargeable power source is connected to charge-receiving elements; and
- the charge-receiving elements are arranged at a bottom section of the container vehicle and face vertically downwards.

In an embodiment of the vehicle, the charge-receiving elements are three separate power sockets for receiving electrical charging current, of which a first power socket is centrally arranged on the bottom section and a second power socket and third power socket is arranged on opposite sides of the first power socket, the three power sockets are arranged in a line along the first or second direction.

In an embodiment, the vehicle may comprise a container carrying arrangement or a container lifting device.

In an embodiment of the vehicle, the rechargeable power source may be arranged to provide electric power to at least one drive motor of the vehicle.

In a third aspect, the present invention provides a charging station for a storage system according to any embodiment of the first aspect, comprising two power pins connected to a charging power source for providing electrical charging current, an actuator and a support structure, wherein the actuator is operably connected to the power pins and arranged to move the power pins in a vertical direction between an upper first position and a lower second position.

The charging power source may be any suitable power system, comprising any required control system for providing a charging current, connected to for instance a local power grid.

In an embodiment of the charging station, the support structure comprises a horizontal plate element having an opening arranged such that the power pins will extend above an upper edge of the opening when in the upper first position and below, or at a level of, the edge when in the lower second position.

In an embodiment of the charging station, the actuator comprises an electric motor, an actuator arm assembly and a vertically arranged slide element to which the power pins are connected, the actuator arm assembly is operatively connected between the electric motor and the slide element, such that rotation of the motor may move the power pins between the upper first position and the lower second position.

In a fourth aspect, the present invention provides a method of charging a vehicle in a storage system, the storage system comprising a horizontal rail grid and a charging system for charging a rechargeable power source of the vehicle, wherein the vehicle comprises a first set of wheels and a second set of wheels for moving the vehicle upon the rail grid;
- the first set of wheels is displaceable in a vertical direction between a first position, wherein the first set of wheels may move the vehicle in a first direction, a second position, wherein the first and the second set of wheels are in contact with the rail grid, and a third position wherein the second set of wheels may move the vehicle in a second direction perpendicular to the first direction;
- the charging system comprises two charge-receiving elements, arranged on a bottom section of the vehicle and connected to the power source, and a charging station comprising two charge-providing elements connected to a charging power source; and
- the charging station comprises an actuator operatively connected to the charge-providing elements and arranged to move the charge-providing elements in a vertical direction; wherein the method comprises the steps of:
  - moving the vehicle in the first direction towards the charging station;
  - stopping the vehicle in a position above the charge-providing elements; and
  - moving the charge-providing elements in a vertical direction, such that the charge-receiving elements and the charge-providing elements are connected.

In an embodiment of the method, the step of moving the charge-providing elements in a vertical direction is preceded by a step of:

displacing the first set of wheels from the first position to the second position such that horizontal movement of the vehicle is prevented.

SHORT DESCRIPTION OF THE DRAWINGS

The present invention is described in detail below by way of example only and with reference to the following drawings:

FIGS. 1 and 2 are perspective views of a prior art automated storage and retrieval system, wherein FIG. 1A and FIG. 2A show the complete system and FIG. 1B and FIG. 2B show examples of prior art container-handling vehicles suitable for use in the system.

FIGS. 14A and 14B are perspective views of an exemplary container transfer vehicle according to the invention.

DETAILED DESCRIPTION OF THE INVENTION

Figure 1:
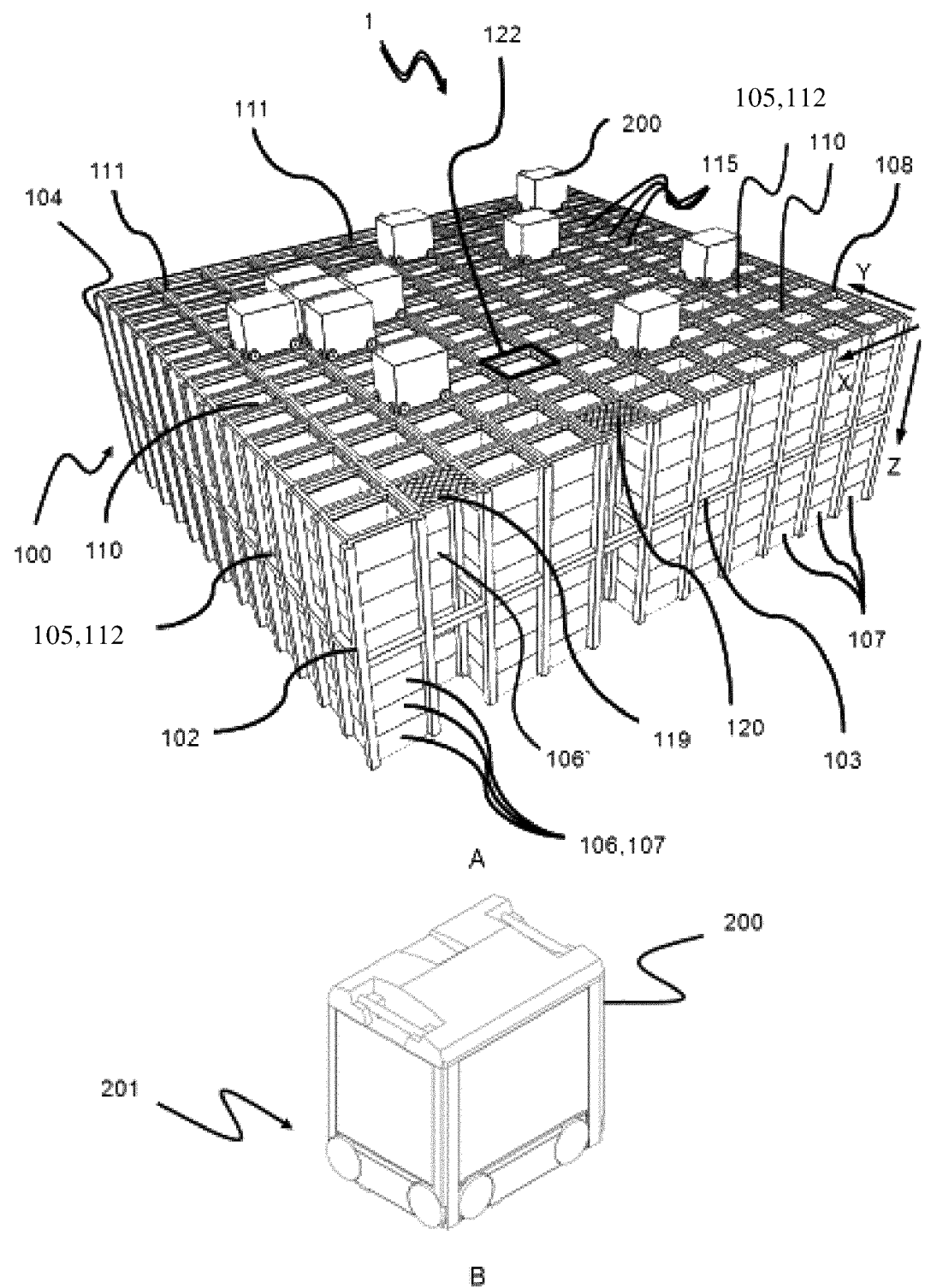

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the related methods as well, and vice versa.

Figure 2:
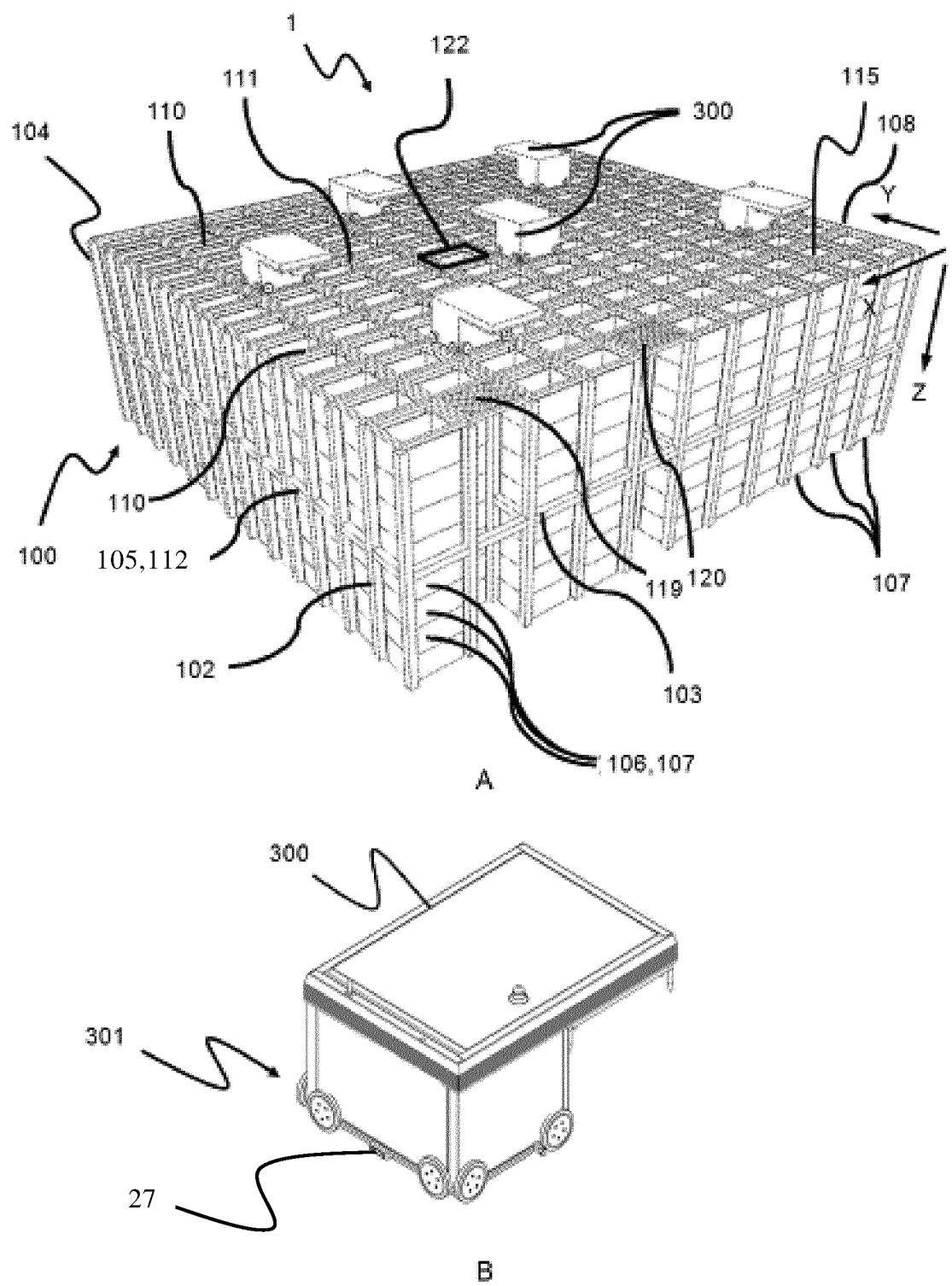
Figure 3:
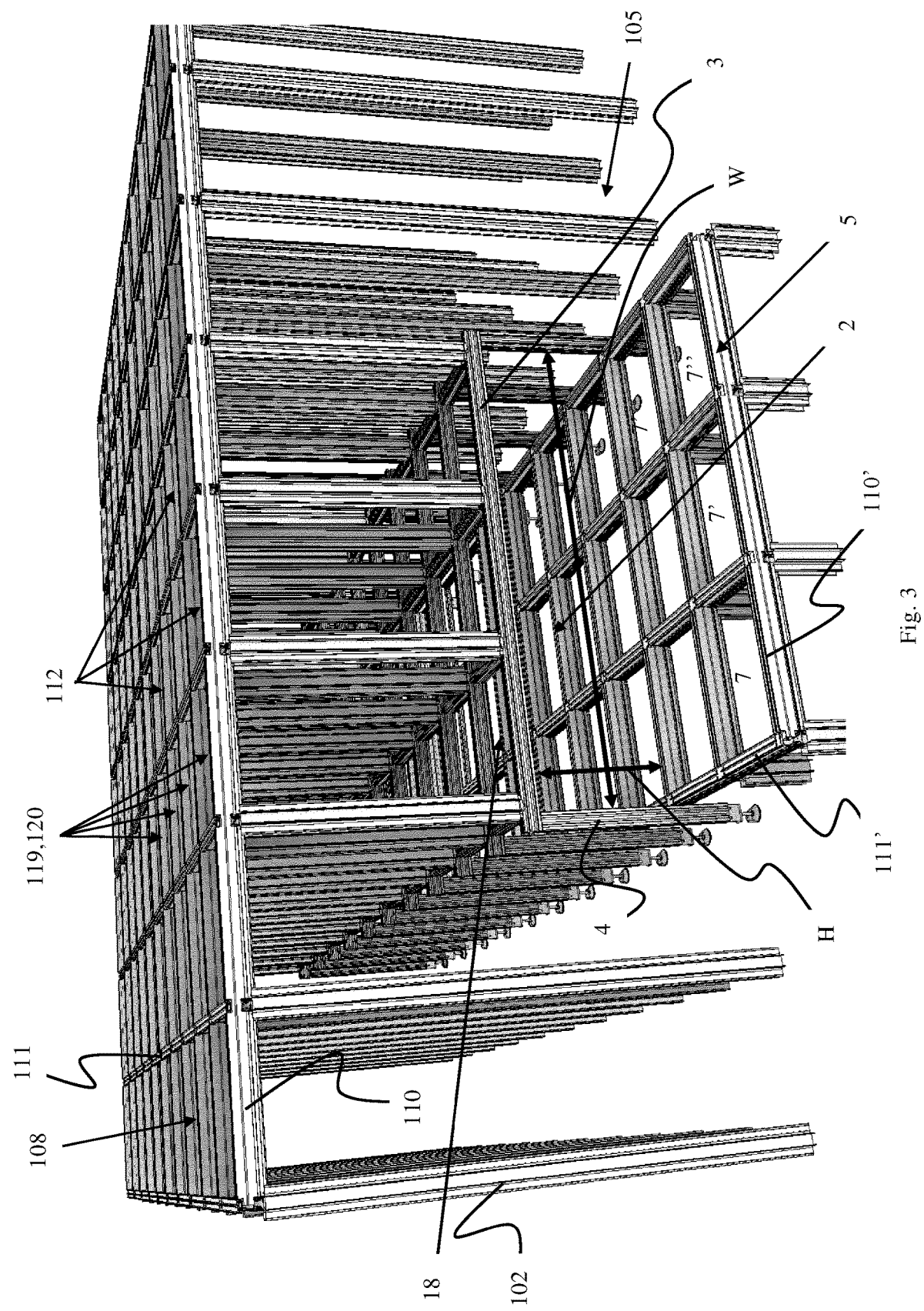
FIG. 3 is a perspective view of a first exemplary storage grid for use in a storage system according to the invention.
Figure 4:
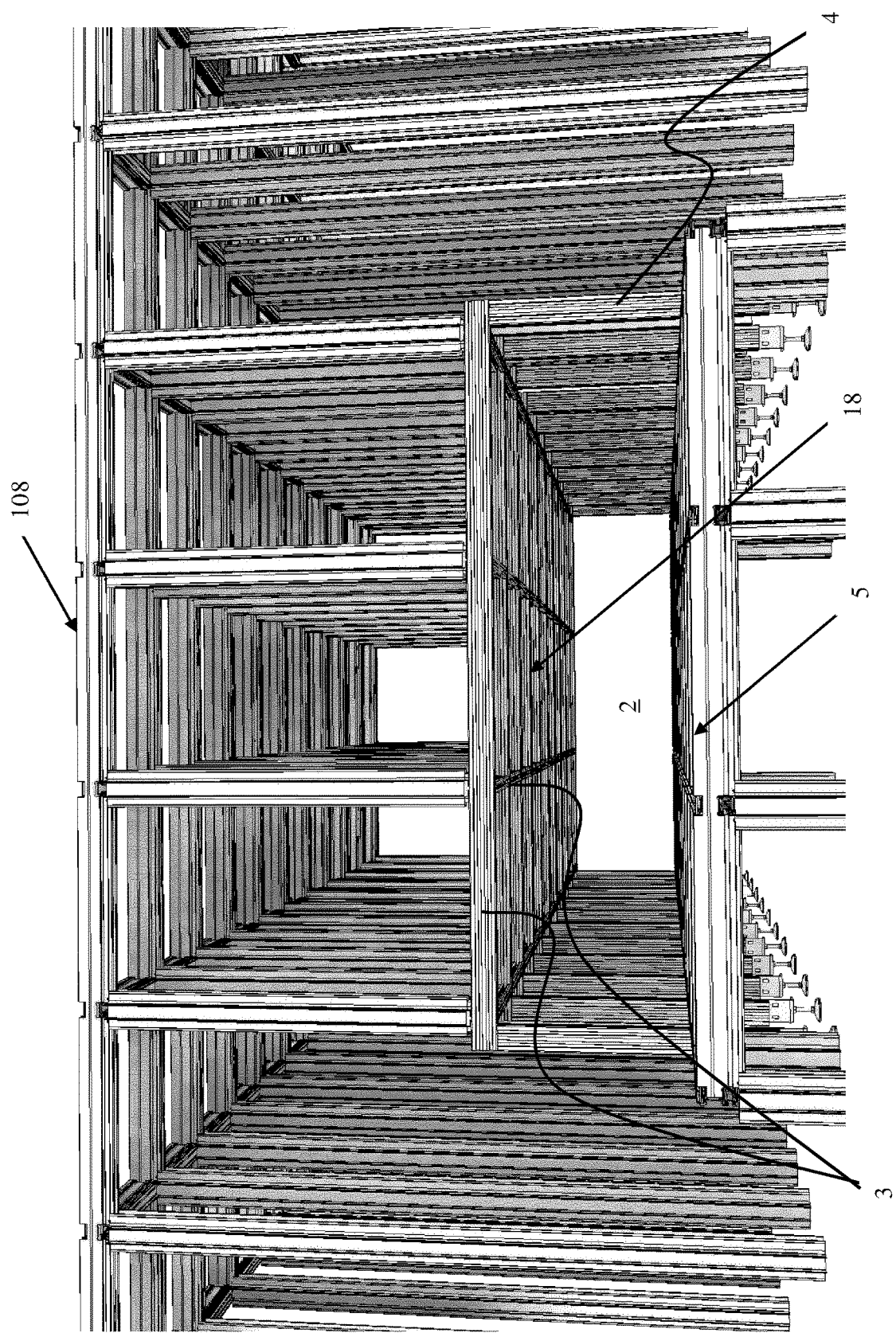
FIG. 4 is a perspective side view of the storage grid in FIG. 3.
Figure 5:
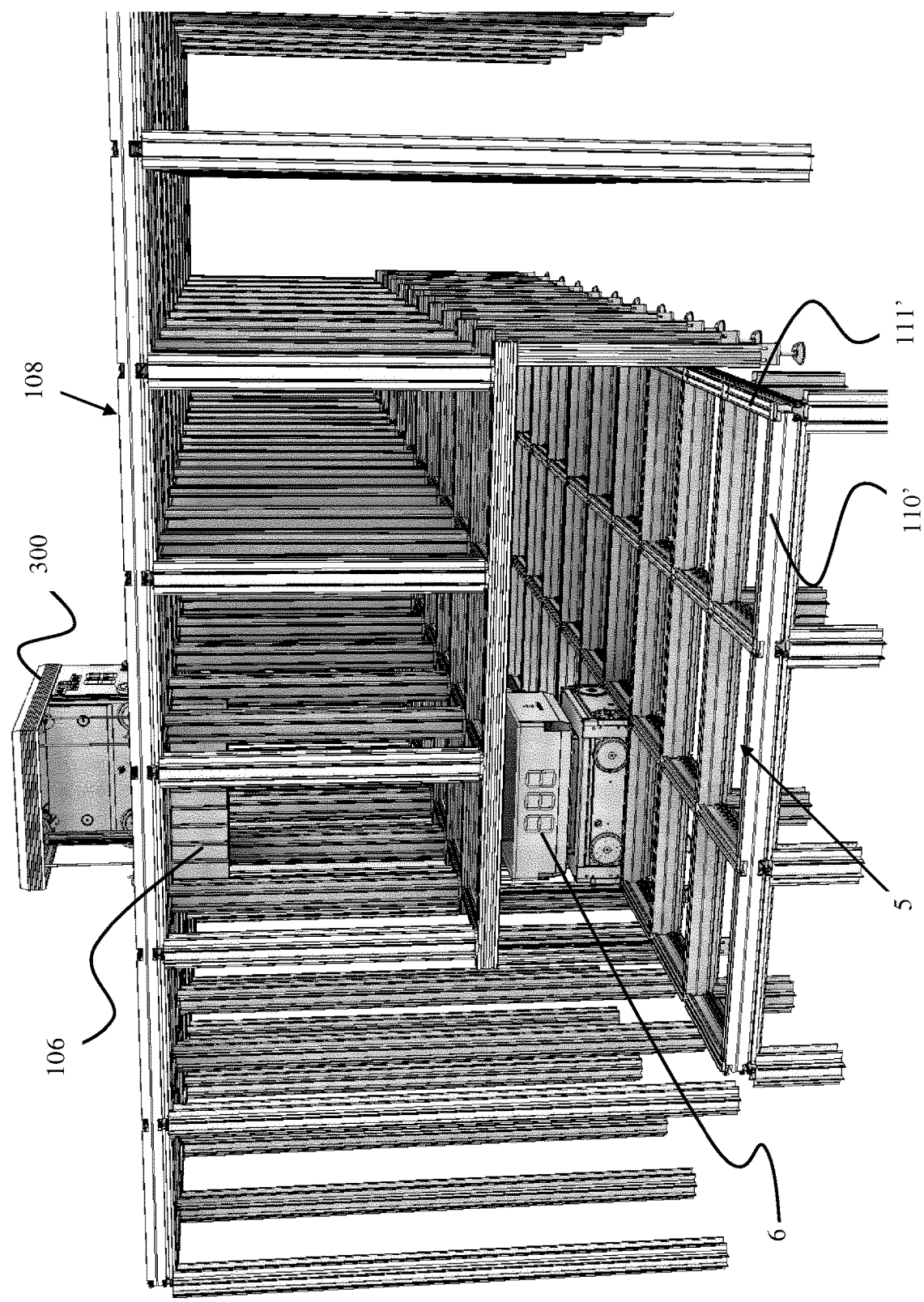
FIG. 5 is a perspective view of the storage grid in FIGS. 3 and 4, featuring a container-handling vehicle and a container transfer vehicle.

An embodiment of a storage grid for an automated storage and retrieval system according to the invention is shown in FIGS. 3 and 4 and the same storage grid featuring a container-handling vehicle 300 and a container transfer vehicle 6 is shown in FIG. 5. The number of storage columns of the grid is scaled down to better illustrate the inventive features of the storage grid. The major part of the storage grid is constructed in the same manner as in the prior art systems shown in FIGS. 1A and 2A. That is, the storage grid structure 104 comprises vertical column profiles 102 defining multiple storage columns 105, in which storage containers 106 can be stored one on top of another in vertical stacks 107. The column profiles 102 are interconnected at their top ends by top rails 110,111 forming a horizontal rail grid 108 (hereinafter termed the top rail grid) upon which container-handling vehicles 200,300 may move in two perpendicular directions.

In addition to the storage columns 105, the storage grid structure of the inventive storage system comprises multiple transfer columns 119,120 through which storage containers may be transferred between the top rail grid 108 (i.e. the top level of the grid) and a transfer section 2 (or tunnel/passageway) extending within the storage grid structure at a level below the top rail grid. The transfer section extends from an opening in an external side of the grid structure 104 and below the multiple transfer columns 119,120. In an advantageous embodiment, especially in connection with large storage grids, the transfer section may extend to a substantially central position of the storage grid, and even pass all the way through the storage grid via a substantially central section of the storage grid structure 104, to reduce the distance a storage handling vehicle 200,300 must travel to reach a transfer column.

The transfer section 2 is defined or constructed by multiple horizontal ceiling profiles 3, vertical support profiles 4 and a section of a horizontal rail grid 5 (hereinafter termed a transfer rail grid). The ceiling profiles 3 providing a horizontal support grid 18. The height H of the transfer section 2 may be defined by the distance between a lowermost surface of a ceiling profile 3 and an upper surface of an opposing rail 110', 111' of the transfer rail grid 5, and the width W of the transfer section is defined by the distance between an inner surface of two support profiles 4 connected to a common ceiling profile 3. The multiple transfer columns 119,120 are defined by vertical column profiles extending from the top rail grid to the ceiling profiles 3. The height H of the transfer section 2 is sufficient to allow a container transfer vehicle 6 to travel within the transfer section 2 when carrying a storage container.

The ceiling profiles 3, and/or the support grid 18, are supported by the vertical support profiles 4 arranged at the periphery of the transfer section 2.

FIG. 5 shows a situation in which a storage container 106 is being transferred between a container transfer vehicle 6 and a container-handling vehicle 300.

The transfer rail grid 5 in the transfer section 2 comprises rails 110',111' (i.e. transfer rails), similar to the rails 110,111 (i.e. top rails) of the top rail grid 108, upon which a container transfer vehicle 6 (or delivery vehicle) may move in two perpendicular directions. The container transfer vehicle 6, see FIGS. 14A and 14B for an embodiment of a suitable transfer vehicle, features a wheel base 36 having a wheel arrangement 32a, 32b allowing the vehicle to travel upon the transfer rail grid 5 and a container carrier 38 for accommodating a storage container to be transferred. The disclosed container transfer vehicle 6 features a container carrier 38 in the form of a deep tray, in which a lower portion of a storage container 106 may be accommodated. However, numerous alternative solutions for suitable container carriers are envisaged and the main functional feature of all suitable containers carriers is the ability to receive a storage container being lowered on top of the container carrier and retain the storage container during movement of the container transfer vehicle upon the transfer rail grid 5. Further, the horizontal periphery of the container transfer vehicle 6 is preferably such that each of the multiple adjacent transfer columns 119,120 may be used to transfer a storage container 106 to a respective container transfer vehicle 6 simultaneously. To obtain the latter function, the horizontal periphery of the container transfer vehicle 6 fits within the horizontal area defined by one of the grid cells 122' of the transfer rail grid 5. Further, the transfer rails 110',111' extending in one of the two perpendicular directions are dual-track rails, see below, to allow multiple container transfer vehicles to be arranged adjacently below the multiple adjacent transfer columns 119,120.

In the arrangement shown, the transfer section 2 has a width W providing room for three separate transfer vehicle paths 7, 7', 7" in a longitudinal direction of the transfer section. By having three separate transfer vehicle paths, three transfer vehicles 6 may pass each other at the same time. To allow this feature, at least the rails 111' extending in the longitudinal direction of the transfer section are dual-track rails. Suitable dual-track rails are disclosed in for example WO 2015/193278 A1 and WO 2015/140216 A1. A dual-track rail 110',111' comprises two parallel tracks. In other words, three parallel dual-track rails may provide two parallel transfer vehicle paths. The rails 110' arranged in a perpendicular direction relative the rails 111' extending in the longitudinal direction of the transfer section may be single-track rails or dual-track rails. In particular, when the storage grid structure 104 comprises multiple adjacent transfer columns 119,120, it may be advantageous that all rails 110',111' in the transfer rail grid 5 are dual-track rail as it provides an optimum flexibility for movement of the container transfer vehicles 6 to/from the positions below the transfer columns 119,120. The design of the transfer rails 110',111' and the wheel arrangement 32a,32b of the container transfer vehicles 6 allows the vehicles to change tracks when needed, i.e. the container transfer vehicle 6 may move in two perpendicular directions upon the transfer rail grid 5. The wheel arrangement may preferably be similar to the ones described for the prior art container-handling vehicles 200,300.

Depending on the requirements of the inventive storage system (i.e. the size of the storage grid, turnover of storage containers etc.) one or more of the transfer vehicle paths 7, 7', 7" are arranged below an optional number of transfer columns 119,120. The grid columns 112 arranged above the transfer section and not designated as transfer columns may be used as storage columns 105' (see FIGS. 6 and 12). This is achieved by adding stopper elements 16 (e.g. brackets fastened to the relevant column profiles) at the lower end of the respective grid columns 102 (the stopper elements in the storage columns 105' arranged above the transfer section 2 is not visible in the drawings). The stopper elements 16 are designed to support a storage container 106 being lowered into the respective grid column 112 and prevent it from entering the transfer section 2 below. In this manner a minimum of potential storage space is lost from the storage grid structure 104 due to the transfer section 2. The stopper elements 16 may also be used to provide an operator passage 17 below a row of storage columns 105' adjacent to the transfer section 2. In this manner, an operator or service person may access a container transfer vehicle 6, for instance in case of a failure preventing the vehicle from exiting the transfer section.

The transfer rail grid 5 extends out of the storage grid structure 104 and depending on the design and extent of the transfer rail grid 5, the container transfer vehicles 6 may be used to transfer storage containers 106 between multiple separate storage grid structures, transfer containers from a storage grid to a picking/stocking stations, transfer to dedicated stocking zones, transfer to an assembly line for delivery of parts, etc.

Figure 7:
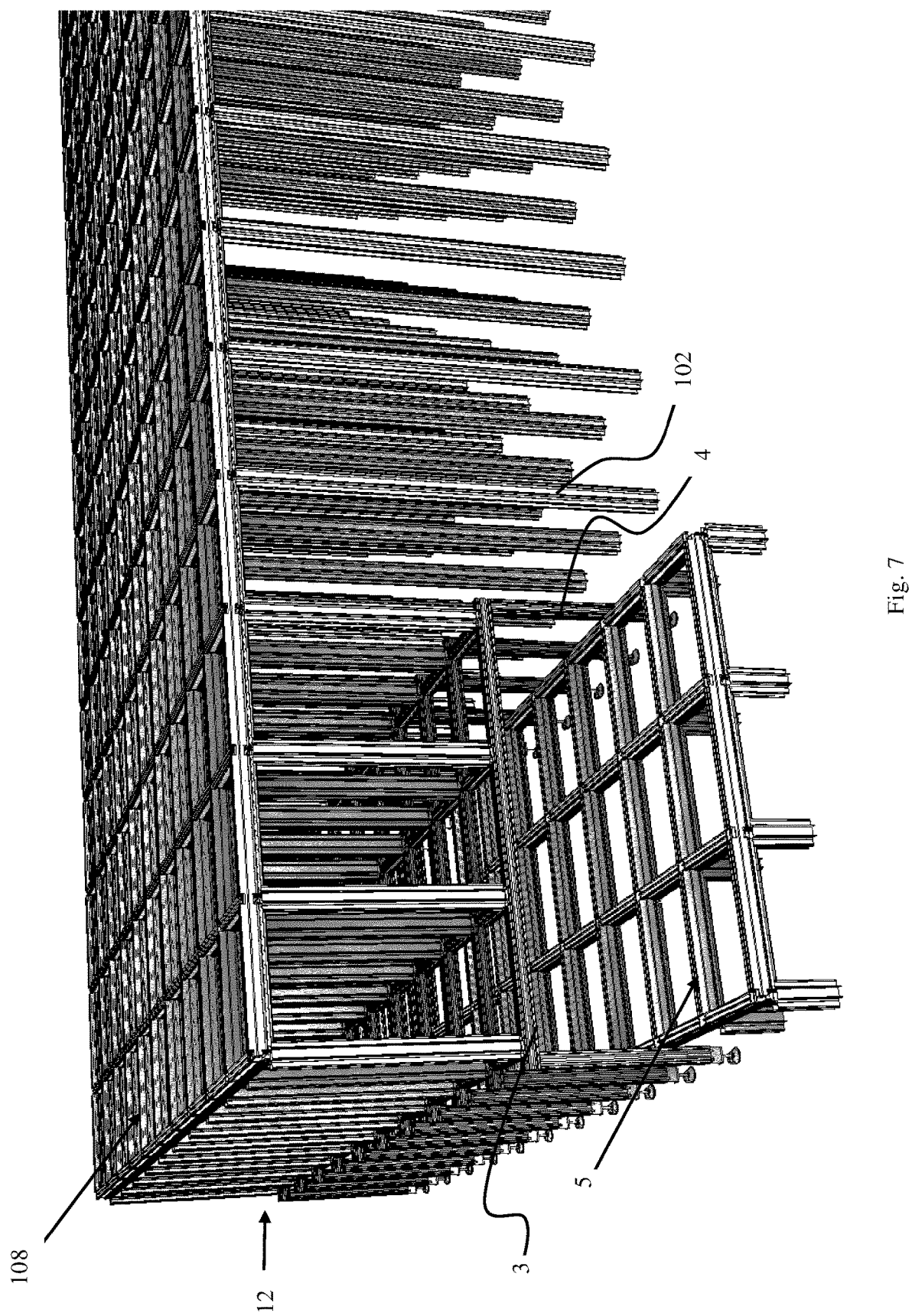
FIG. 7 is a perspective view of a second exemplary storage grid for use in a storage system according to the invention.
Figure 8:
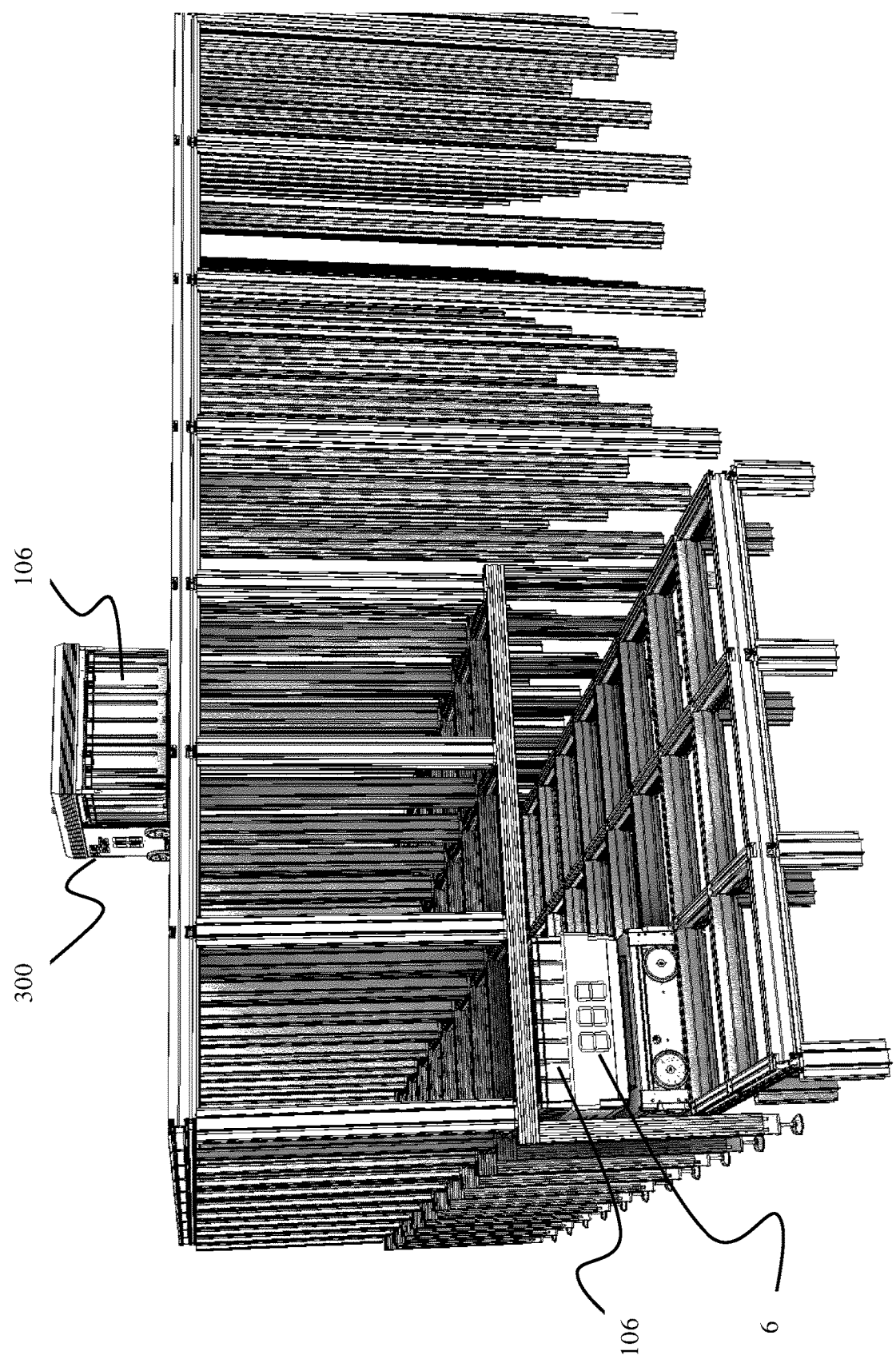
FIG. 8 is a perspective view of the storage grid in FIG. 6, featuring a container-handling vehicle and a container transfer vehicle.

A second embodiment of the storage grid 104 for an automated storage and retrieval system according to the invention is shown in FIGS. 7 and 8. In this embodiment, the differentiating feature in view of the embodiment discussed above is that the transfer section 2 is arranged along or adjacent an external side section 12 of the storage grid 104.

Figure 9:
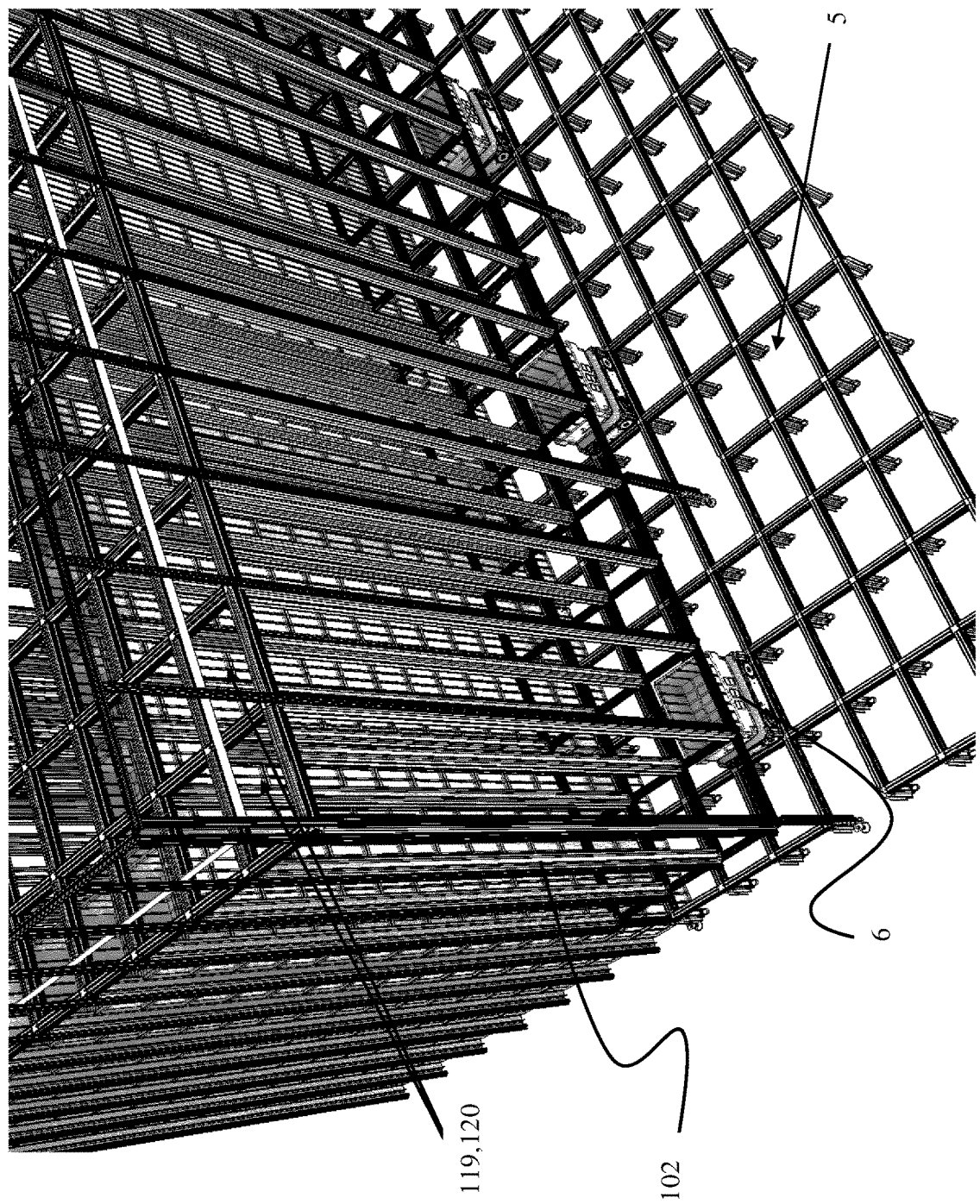
FIG. 9 is a perspective top view of a third exemplary storage grid for use in a storage system according to the invention.
Figure 10:
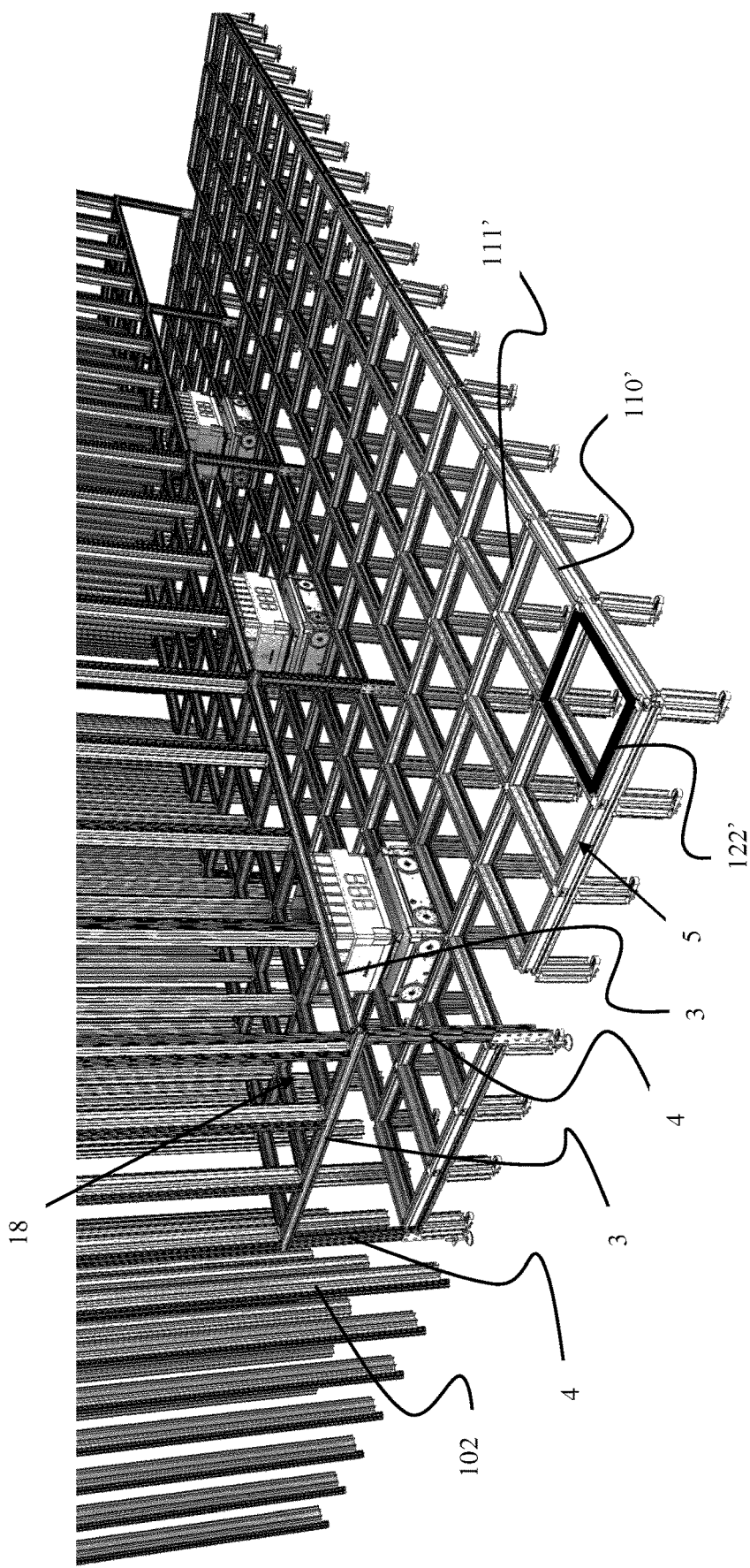
FIG. 10 is a perspective side view of a third exemplary storage grid for use in a storage system according to the invention.

A third embodiment of the storage grid 104 for an automated storage and retrieval system according to the invention is shown in FIGS. 9 and 10. The main differentiating feature of the third embodiment in view of the embodiments discussed above is the construction of the support grid 18 allowing the container transfer vehicles to exit/enter the transfer section via the longitudinal side of the transfer section.

The preferred arrangement and size of the transfer section 2 in any given storage system, as well as the positioning of the transfer columns 119,120, will depend on the size of the storage grid structure 104, the intended use of the storage system 1, the available space in which the storage system is arranged, the shape/layout of said space, etc. Independent of the specific positioning of the transfer section 2 within the storage grid structure, the storage system according to the invention will provide a number of advantages in view of the prior art storage systems, as disclosed throughout the present specification.

Figure 11:
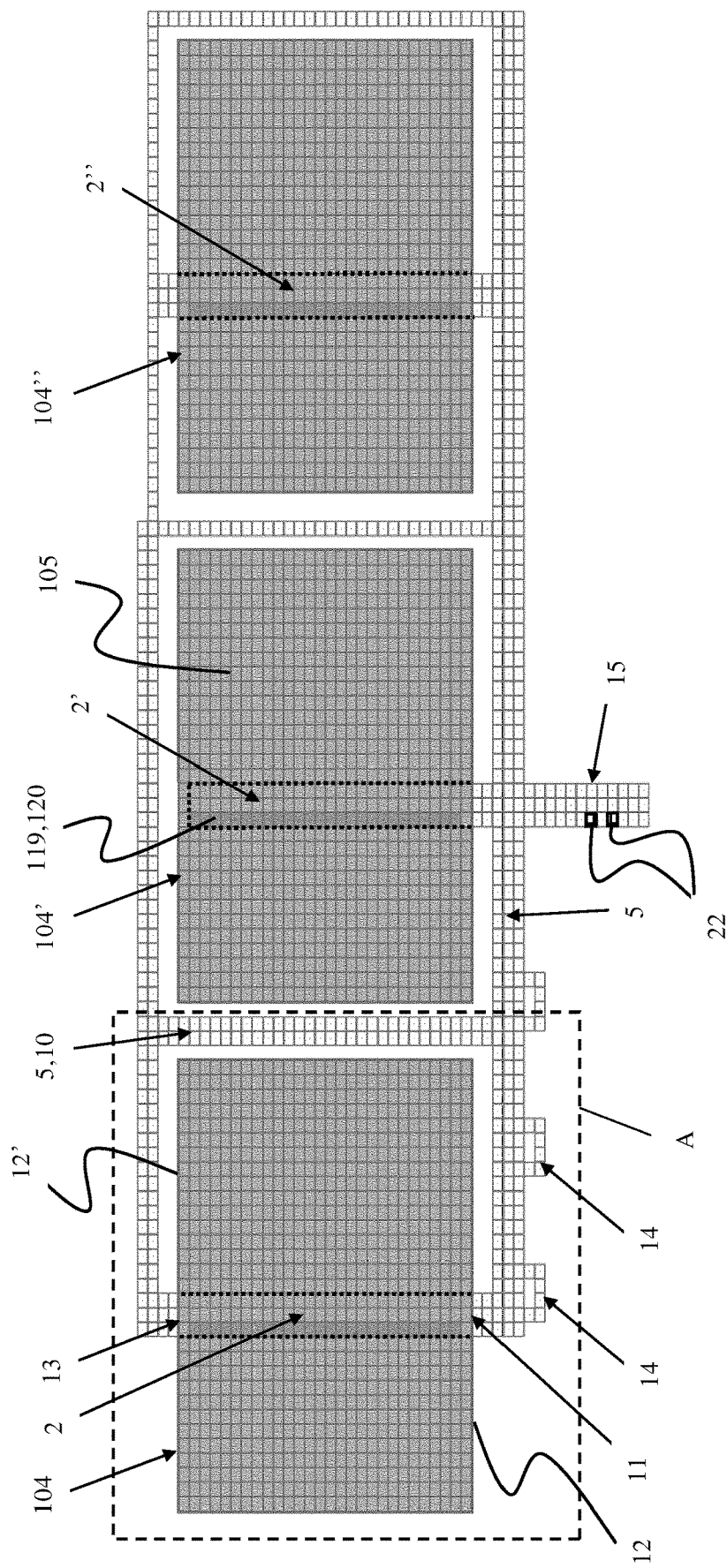
FIG. 11 is a schematic top view of an exemplary storage system according to the invention.
Figure 12:
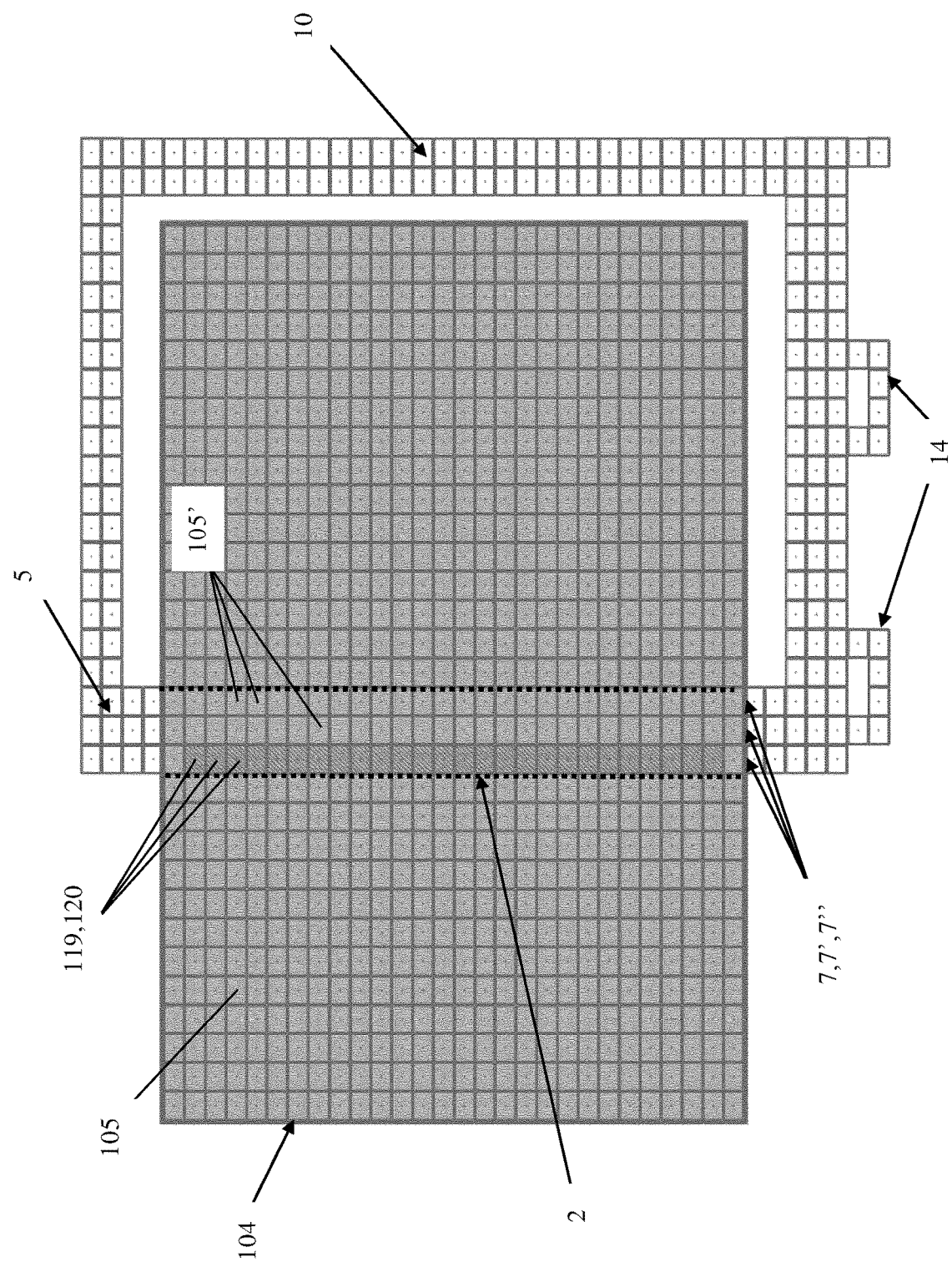
FIG. 12 is a detailed view of a section of the storage system in FIG. 11.

A schematic overview of an exemplary layout of an inventive storage system 1 is shown in FIGS. 11 and 12. The exemplary layout illustrates some of the many advantages of the inventive storage system.

The storage system in FIG. 11 comprises three separate storage grid structures 104, 104', 104". Each of the first and the third storage grid structures 104,104" features a transfer section 2,2" extending through the whole respective storage grid structure, i.e. the transfer sections extend from a first opening 11 in an external side 12 of the storage grid to a second opening 13 in an opposite external side 12'. In this manner, a container transfer vehicle 6 having received or delivered a storage container 106 via any of the multiple transfer columns 119,120 may exit the first 11 or the second opening 13 of the transfer section 2 depending on which pathway to a selected destination is most efficient.

Each of the transfer sections 2,2',2" features three transfer vehicle paths 7, 7', 7", see FIG. 9. The first vehicle path 7 is arranged below multiple adjacent transfer columns 119,120, through which storage containers 106 may be transferred between the top rail grid 108 and a container transfer vehicle 6. The second and third vehicle paths 7',7" are arranged below multiple storage columns 105' and are predominantly used by the container transfer vehicles 6 to travel within the transfer section to or from a transfer column 119,120. The transfer section 2' in the second storage grid 104' does not extend all the way through the storage grid, and a container transfer vehicle 6 will always enter and exit the transfer section via the first opening.

Figure 13:
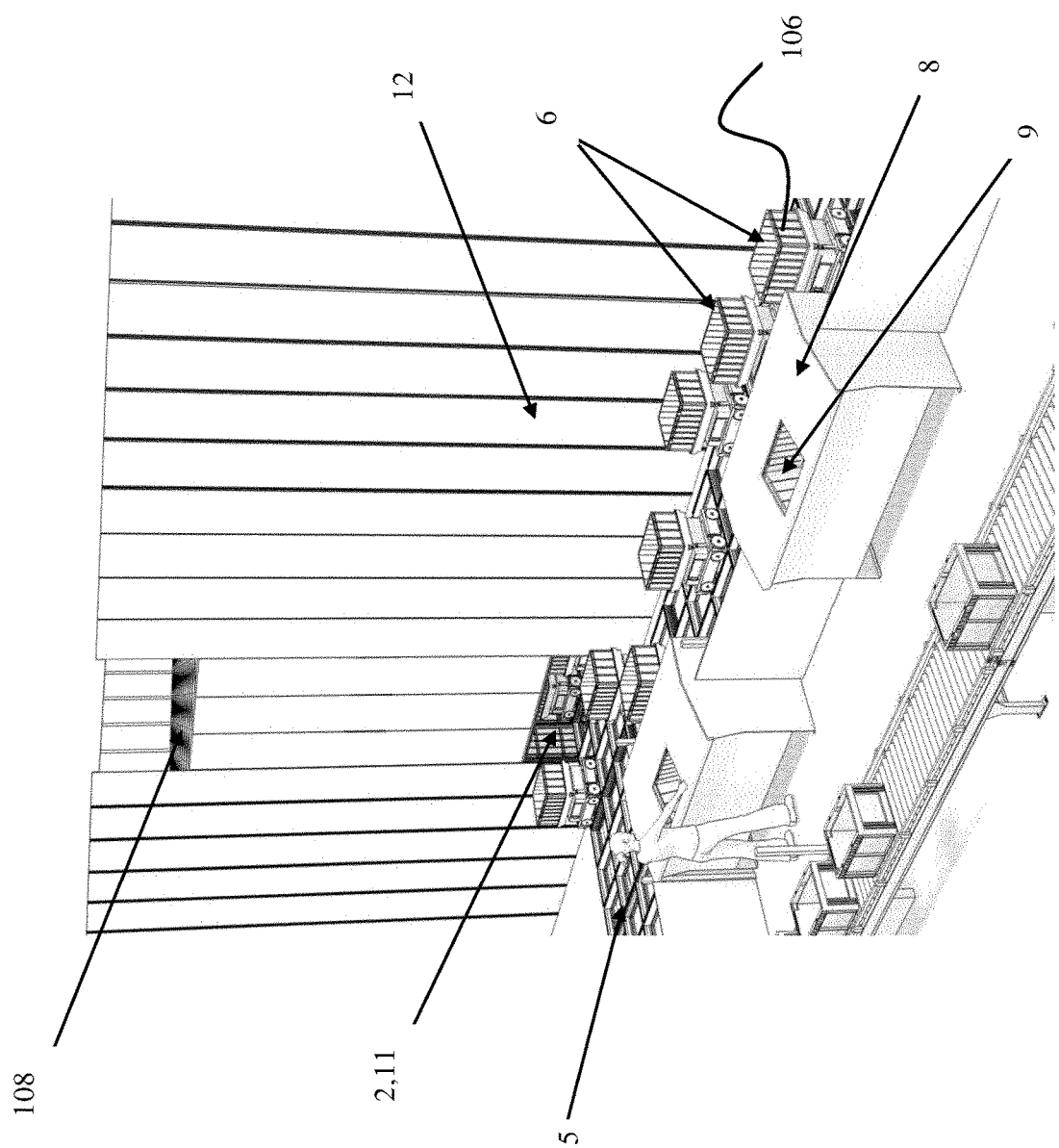
FIG. 13 is a perspective view of an exemplary storage system according to the invention.

The transfer grid 5 interconnects the transfer columns 119,120 of the first storage grid 104 with transfer columns 119,120 of the second and third storage grid 104', 104", with rail loops/circuits 14 (that may for instance be arranged at a picking/stocking station, see FIG. 13), with a multi-use transfer grid area 15 and any other destination to which the transfer of a storage container is desired. The multi-use transfer grid area 15 may for instance be used for stocking large amounts of new items to the storage grid, as temporary parking for transfer vehicles carrying storage containers comprising high-demand items, and/or as a loading area for storage containers to enter the storage grids.

In the exemplary layout in FIG. 11, the multi-use transfer grid area 15 comprises two charging stations 22 for charging the batteries of the container transfer vehicles 6. The type of charging station(s) used for the container transfer vehicles 6 and the container-handling vehicles 200,300 will depend on the specific charging system used. A description of an inventive charging system suitable for the container transfer vehicles 6, and the prior art container-handling vehicles 300 having a cantilever construction, is described below by reference to FIGS. 15-24.

Use of an area or section of the transfer grid 5 to accommodate container transfer vehicles 6 carrying storage containers 106 comprising high-demand items, i.e. a parking section of the transfer grid, provides for a highly efficient method of retrieving items that have a very high picking rate, i.e. that have a particularly high turnover. In prior art systems such high turnover items entail that the specific storage container(s) in which these items are stored is transferred back and forth between a storage column 105 and a picking/stocking station more or less continuously. In the inventive storage system, items having a particularly high turnover may permanently (or at least intermediately) be stored in a storage container arranged on a transfer vehicle 6. In this manner, high turnover items may be accessed in a very short time, crowding at the transfer columns are further minimized and unnecessary use of the container-handling vehicles 200,300 are avoided.

The schematic overview in FIG. 12 shows details of the first storage grid 104 in FIG. 11 but may also illustrate an alternative layout of a storage system comprising a single storage grid 104.

FIG. 13 discloses an embodiment of an inventive storage system having a layout substantially as shown in FIG. 12. The storage system features two picking/stocking stations 8, wherein each is arranged such that a container transfer vehicle 6 may pass beneath a container access opening 9 arranged in the picking/stocking station while moving on the transfer rail grid 5. In other words, the picking/stocking stations 8 are arranged such that a container transfer vehicle 6 may pass through the picking/stocking station via rail loops 14 as shown in FIGS. 11 and 12. Thus, a storage container 106 containing an item to be picked (or a storage container into which an item is to be stocked) is first retrieved by a container-handling vehicle 200,300 arranged on the top rail grid 108, lowered to a container transfer vehicle 6 positioned inside the transfer section 2 beneath a suitable transfer column 119,120, and transported by the container transfer vehicle 6 to a picking/stocking station 8, wherein the transfer vehicle stops at a position beneath the container access opening 9 to allow an operator to pick the item.

The storage system 1 shown in FIGS. 11 and 12, features three laterally separated storage grid structures 104, 104', 104" arranged at the same level. However, it is also envisioned that the storage system according to the invention may comprise storage grid structures separated in a vertical direction, e.g. stacked on top of each other. When separated in the vertical direction, the transfer rail grid of the storage system may for instance comprise a container transfer vehicle lift for lifting a container transfer vehicle between separate levels of the transfer rail grid, such that a container transfer vehicle may access all areas of the transfer grid.

In the disclosed embodiments of the invention, the transfer section 2 comprises a section of the transfer rail grid 5 featuring three parallel vehicle paths 7,7',7" allowing three transfer vehicles 6 to pass each other at the same time. However, many of the advantages of the present inventive storage system may also be obtained by use of a transfer section 2 comprising at least one vehicle path provided the track is arranged below at least one transfer column 119,120.

In the disclosed embodiments of the invention, the transfer rails 110',111' of the transfer rail grid 5 are dual-track rails identical to the rails 110,111 of the top rail grid. This feature is advantageous in a cost perspective since the number of different parts used in constructing the storage grid structure 104 is minimized. Further, it allows for the use of transfer vehicles 6 having a wheel arrangement similar to the one used in the container-handling vehicles 200,300, a feature which significantly simplifies the overall system cost. However, the main advantages of the inventive storage system and storage grid structure, e.g. a highly flexible and efficient transfer of storage containers in and out of the storage grid, as well as the avoidance of single point of failures disrupting the operation of the storage system, may also be obtained by embodiments of the invention, wherein the transfer rails of the transfer rail grid 5 are different from the rails of the top rail grid 108. An important feature for avoiding a single point of failure is that the container transfer vehicles may pass each other and move in two perpendicular directions upon at least the section of the transfer rail grid arranged in the transfer section. This feature allows the container transfer vehicles to pass around for instance a non-functioning container transfer vehicle which would otherwise have caused an interruption of the storage system operation. The presence of multiple transfer columns may further minimize any risk of a single point of failure disrupting the operation of the storage system.

It is noted that the dimensions of the grid cells 122 (see prior art system in FIGS. 1A and 2A and the relevant prior art description) of the top rail grid 108 are preferably similar or identical to the dimensions of the grid cells 122' (see FIG. 10) of the transfer rail grid 5. Having the grid cells of similar dimensions allows for an optimum use of the inventive storage system, e.g. by allowing adjacent transfer columns to be used simultaneously.

Although the use of dual-track rails 110',111' in at least one direction of the transfer rail grid 5 provides several advantages with regards to for instance space efficiency by allowing container transfer vehicles 6 to pass each other at adjacent grid cells 122', an advantageous storage system may also be obtained by having a transfer grid comprising only single-track rails. Use of single-track rails would require a slightly larger transfer grid to allow container transfer vehicles 6 passing each other, as compared to dual-track rails, since such a grid would not allow the container transfer vehicles 6 to pass each other on adjacent grid cells 122'. For instance, the dual-track transfer rails 110',111' of the transfer grid 5 disclosed in FIGS. 3 and 5 could be replaced by single-track rails. In that case, two container transfer vehicles 6 would still be able to pass each other upon the transfer grid 5, for instance by having one of the container transfer vehicles travelling on vehicle path 7 and the other on vehicle path 7".

A storage system featuring an inventive charging system is disclosed in FIGS. 15-24. Container transfer vehicles 6, container handling vehicles 200,300 and wheel bases 26 suitable for the charging system may generally be termed vehicles. The vehicles have in common that they feature a first set of wheels 32a and a second set of wheels 32b for moving the container vehicle or wheel base upon a rail grid 5,108. The first set of wheels 32a is displaceable in a vertical direction between a first position, wherein the first set of wheels may move the vehicle in a first direction X, a second position, wherein the first and the second set of wheels are in contact with the rail grid, and a third position wherein the second set of wheels 32b may move the vehicle in a second direction Y perpendicular to the first direction. The charging system may be used in combination with any suitable rail grid, such as any of the transfer rail grid 5 and the top rail grid 108 disclosed in the storage systems in FIGS. 1-13.

Figure 15:
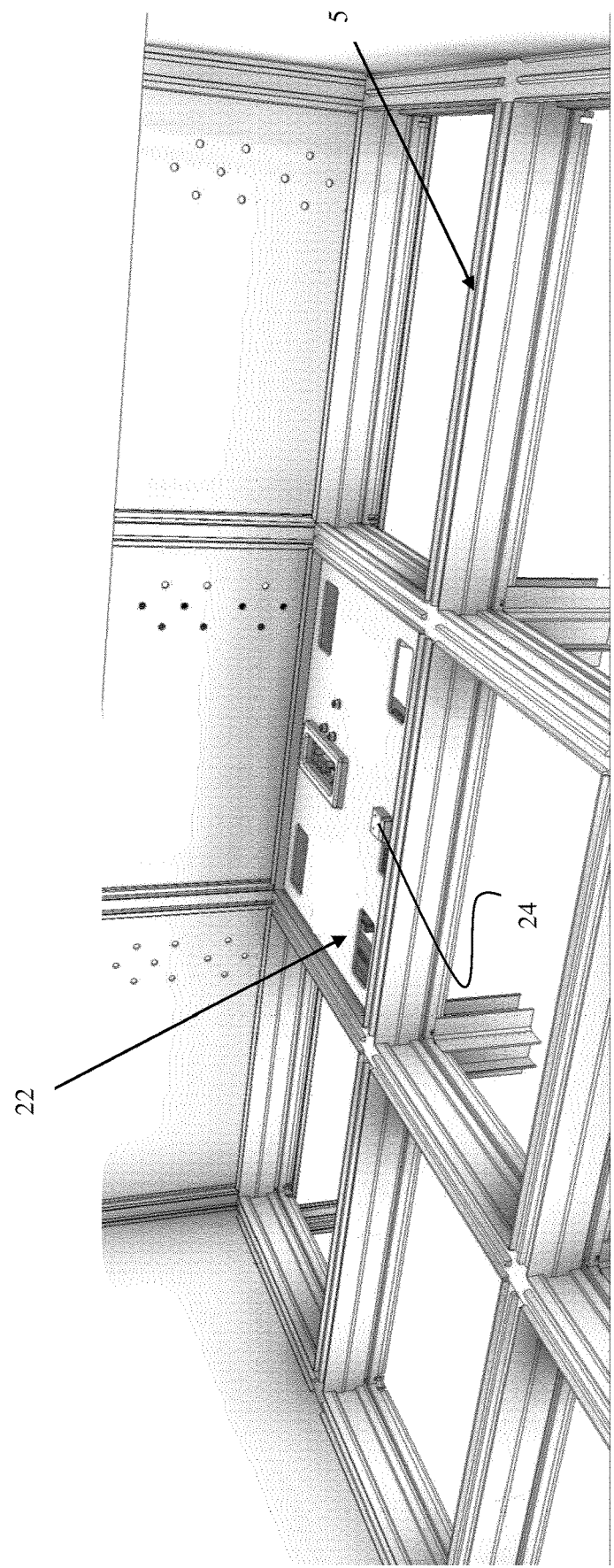
FIG. 15 is a perspective view of a rail grid featuring an exemplary charging station according to the invention.
Figure 16:
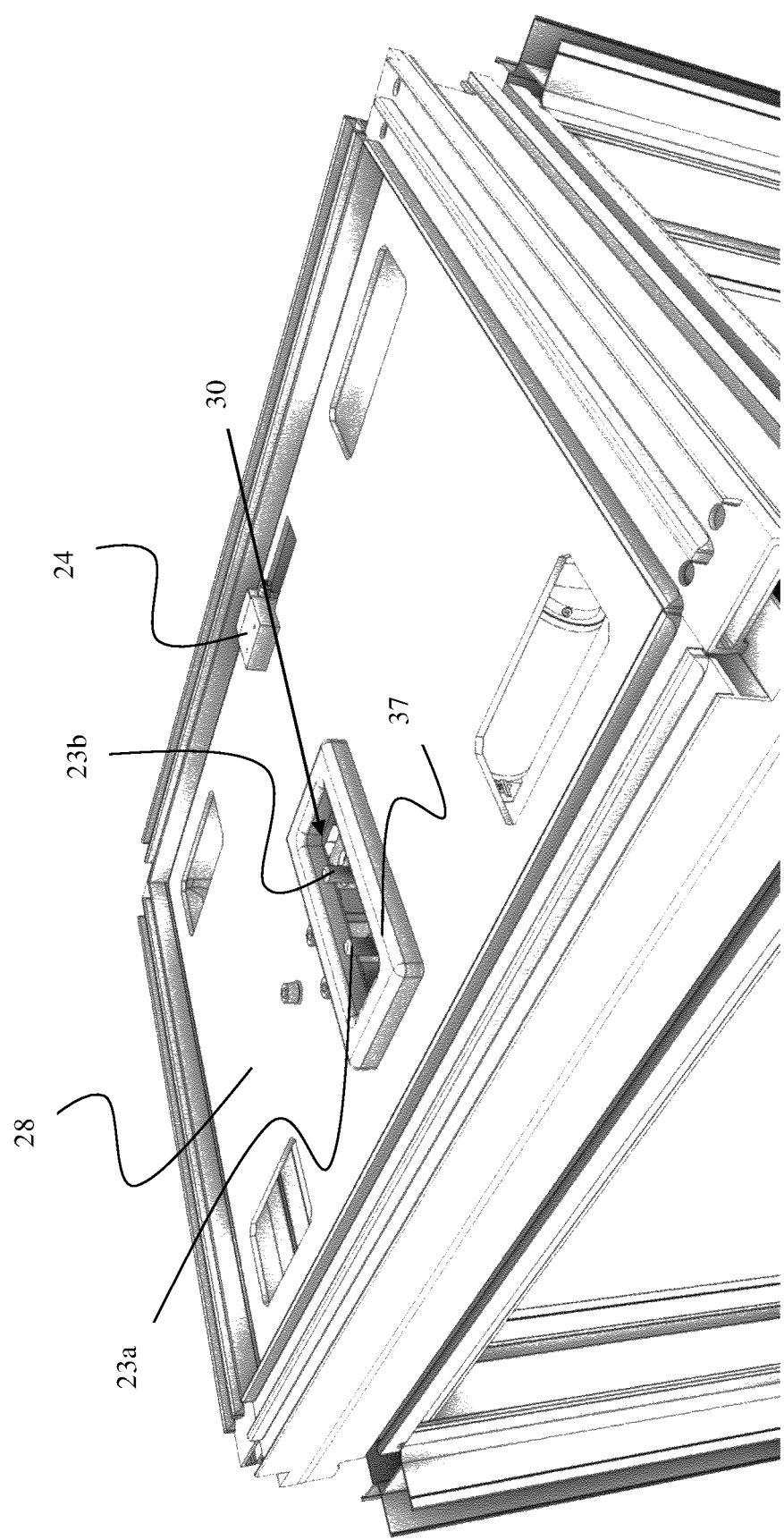
FIGS. 16 and 17 are perspective views of the charging station in FIG. 15.
Figure 17:
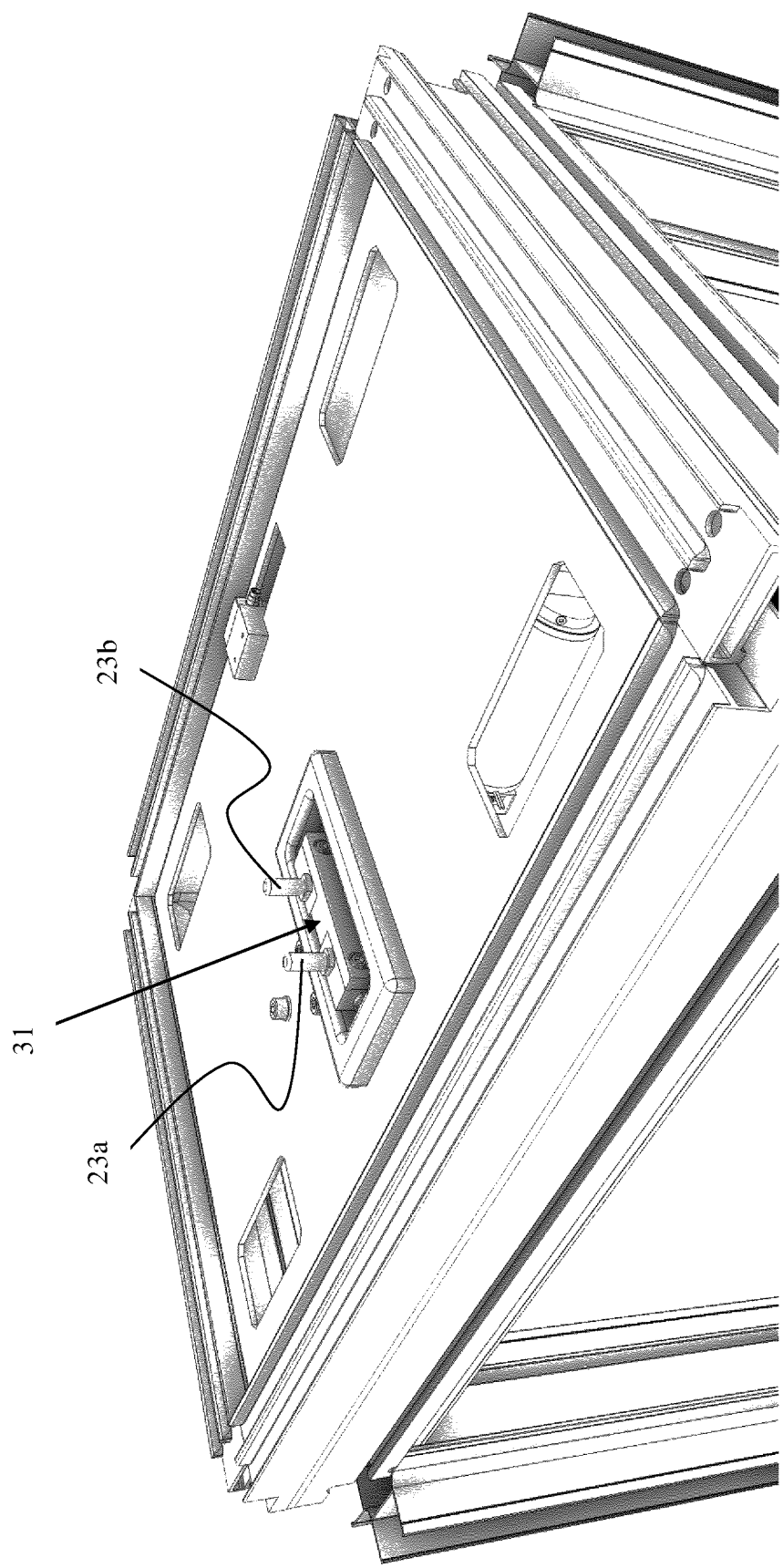

A charging station 22 of the inventive charging system is shown in FIGS. 15-17. In this embodiment, the charging station 22 is arranged within a grid cell 122' (see FIG. 10) of a transfer rail grid 5. The charging system may have any number of charging stations 22 depending on for instance the size of the storage system and the number of container vehicles. Each charging station features a support structure 29, an actuator 31 and two power pins 23a,23b (i.e. charge-providing elements) connected to a charging power source 33 (see FIG. 18) by wires 34. The support structure comprises a horizontal plate element 28 having an opening 30 featuring an upper edge 37 (see FIG. 16). The charging station features a positioning sensor 24 to detect whether a vehicle is in a correct position upon the charging station prior to charging.

By having the charging station arranged within a single grid cell, other vehicles arranged on the rail grid may pass the charging station at the grid cells or rails being adjacent to the charging station even when a vehicle is being charged.

Figure 18:
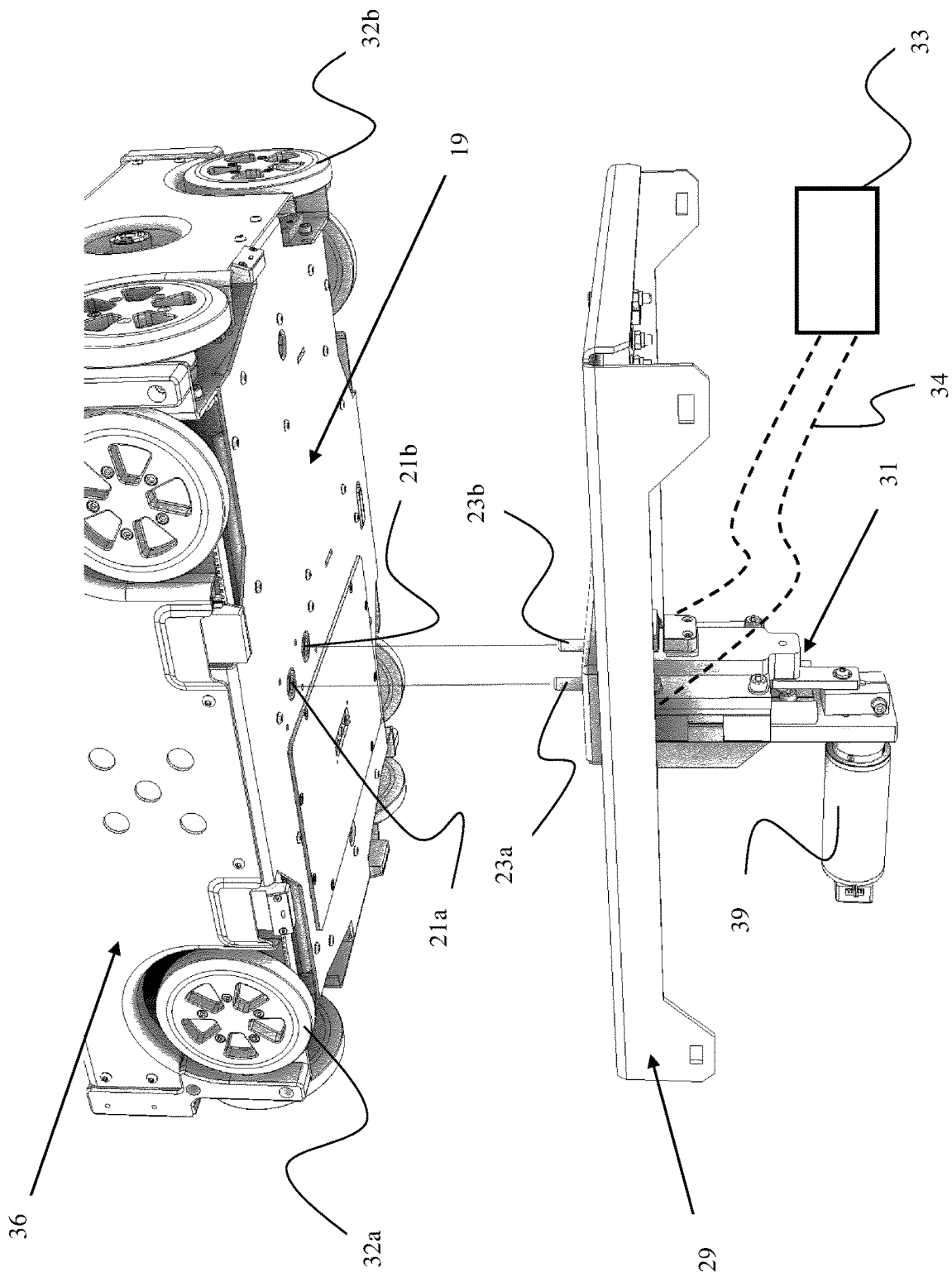
FIG. 18 is a perspective view of an exemplary container transfer vehicle arranged above a charging station as shown in FIGS. 15-17.
Figure 19:
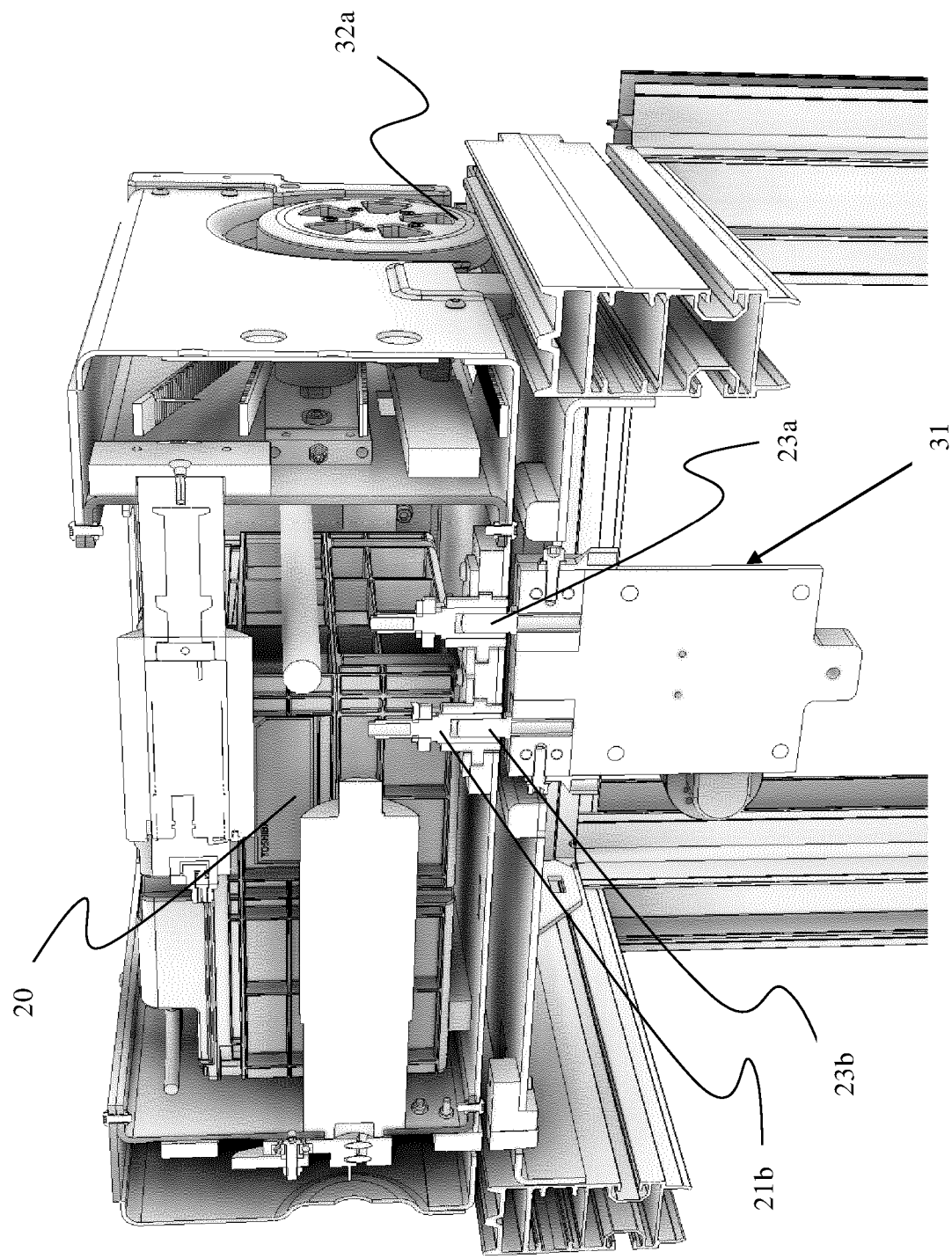
FIG. 19 is a perspective sectional view of the charging station and the container transfer vehicle in FIG. 18.
Figure 20:
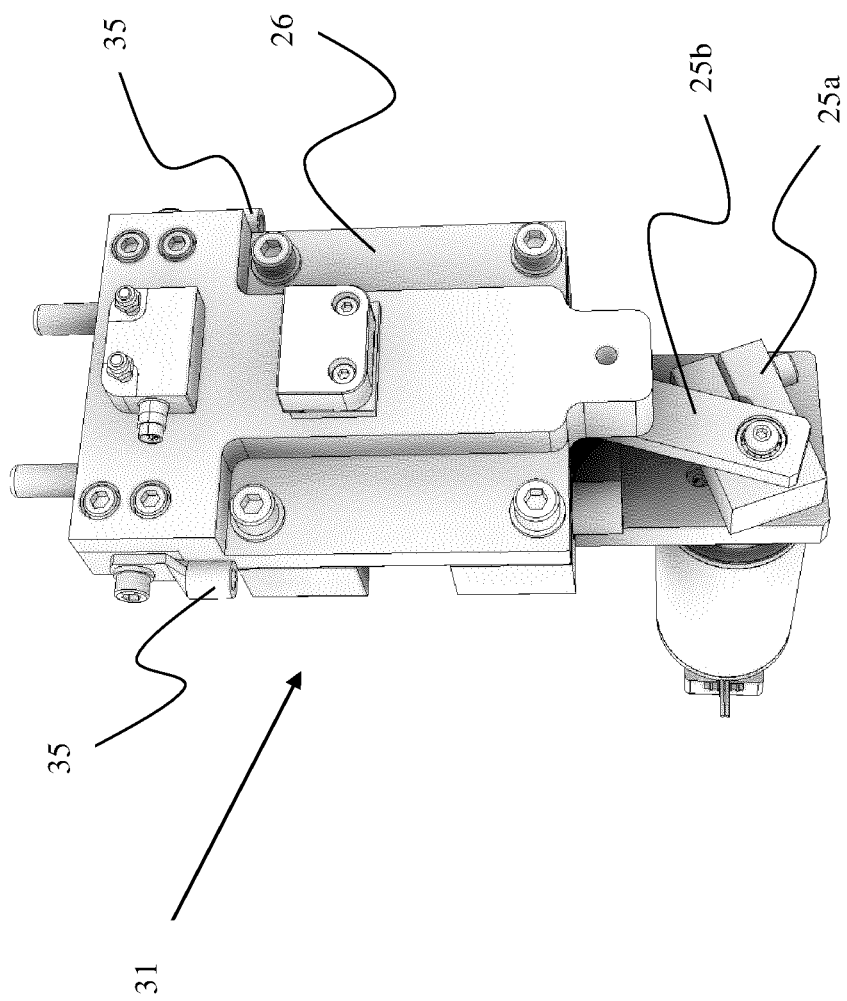
FIG. 20 is a perspective view of an actuator of the exemplary charging station in FIG. 18.
Figure 21:
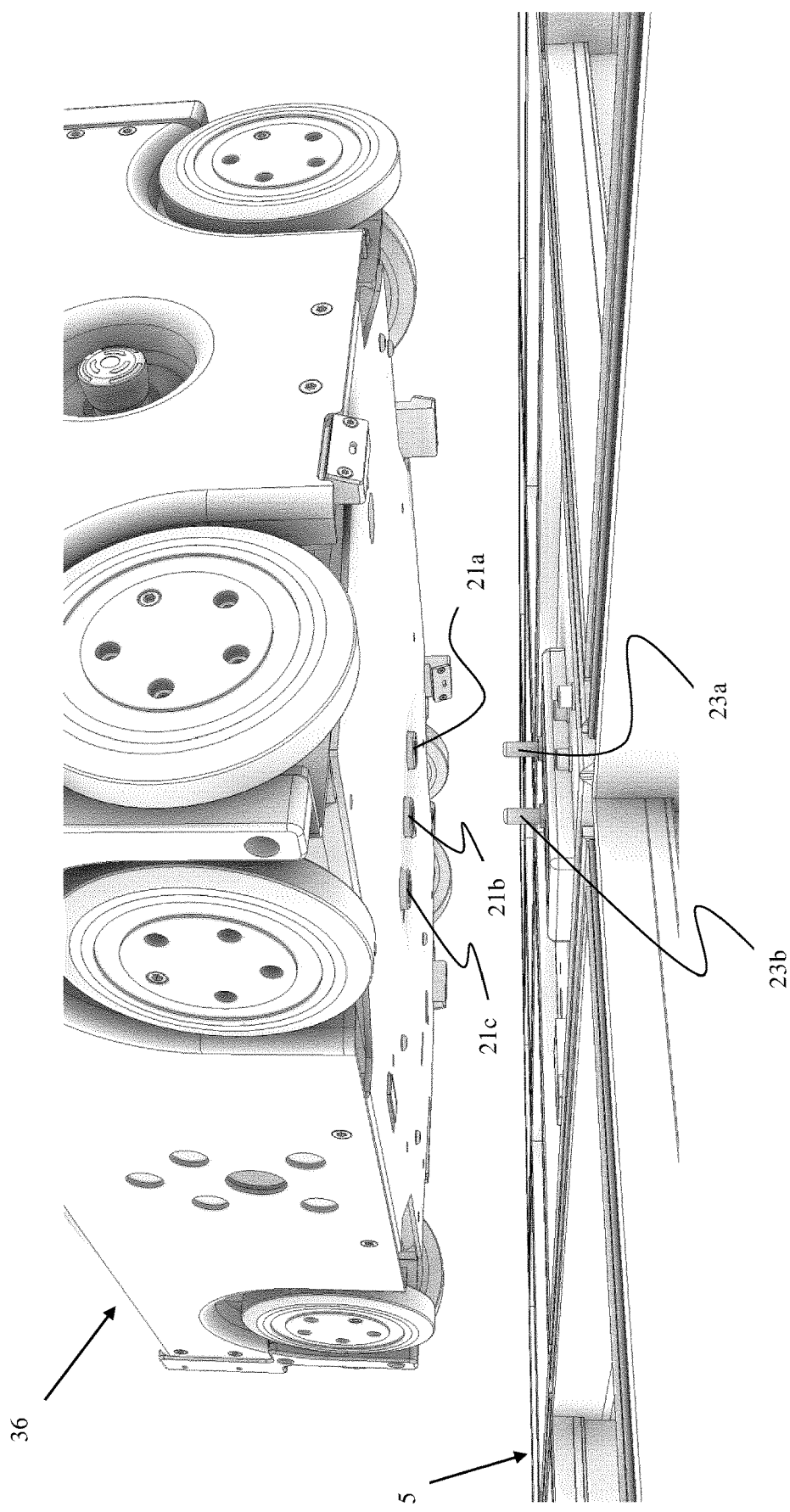
FIG. 21 is a perspective view of an exemplary container transfer vehicle arranged above a charging station as shown in FIGS. 15-17.

The actuator 31, see FIGS. 18-20 for a detailed view, comprises an electric motor 39, a crank arm 25a (i.e. a first actuator arm) coupled to a rotary axle of the electric motor and pivotably connected to a push/pull arm 25b (i.e. a second actuator arm, which combined with the first actuator arm provide an actuator arm assembly), and a vertically arranged slide element to which the power pins 23a,23b are connected. The crank arm 25a and the push/pull arm 25b are operatively connected between the electric motor and the slide element, such that rotation of the motor may move the power pins between an upper first position, wherein the power pins will extend above the upper edge 37 of the opening 30 (see FIG. 17), and a lower second position, wherein an upper end of the power pins is below, or at the level of, the edge 37 (see FIG. 16). The power pins may be connected to a charging power source 33 via the wire connectors 35.

A wheel base 36 is used to illustrate the function of the inventive charging system. However, the charging system may be adapted for any type of vehicle, such as container vehicles 6,200,300, featuring a first set of wheels 32a and a second set of wheels 32b as described above.

The wheel base, see FIGS. 18 and 19, features two separate power sockets 21a,21b (i.e. charge-receiving elements) arranged at a bottom section 19 and connected to a rechargeable battery 20 (i.e. a rechargeable power source) via a set of wires (not shown). The rechargeable battery 20 is used to drive any selected electric motor of the wheel base 36, e.g. wheel motors. Each power socket 21a,21b features a contact complementary to the corresponding plug and faces in a downwards direction. In the present embodiment, the power sockets 21a,21b are designed as separate sockets, but may in other embodiments form a unitary power socket having a separate contact for each of the power pins (i.e. a single power socket providing two charge-receiving elements). The charging may be controlled by any suitable control system known to the skilled person, e.g. a control system like any used in the prior art charging stations/systems. Preferably, the control system will ensure that the charge-providing elements supply required current based on the condition of the rechargeable battery. The condition may be based on at least one of voltage, temperature, state of charge, depth of discharge, state of health and current. The control system may in further embodiments feature a first signal transfer element arranged on the wheel base and connected to the power source, and the charging station may feature a second signal transfer element connected to the charging power source. The first and second signal transfer elements may be arranged to be connected when the power sockets and pins are connected. In an embodiment, the first signal transfer element may be a socket and the second signal transfer element may be a pin operatively connected to the actuator, such that the signal transfer elements are connected when the power sockets and pins are connected. Alternatively, the required signalling between the rechargeable battery 20 and the charging station may advantageously be performed by any suitable wireless transfer.

A second embodiment of a charging system according to the invention is shown in FIGS. 21-24. The main differentiating feature of the wheel base 36 of the second embodiment is the presence of a third separate power socket 21c arranged at a bottom section of the wheel base 36, and the central positioning of the first power socket 21b. The presence of the additional power socket 21c ensures that the wheel base 36 may be charged by the charging station even if it is turned 180 degrees relative the charging station when positioned upon a rail grid 5,108. This feature is especially advantageous when the wheel base 36 is part of a container handling vehicle having a cantilever section, e.g. a container vehicle like the prior art vehicle 300 shown in FIG. 2B. The centrally arranged power pin 23b will always be in contact with the power socket 21b during charging, while the other power pin 23a will be in contact with one of the other two power sockets 21a,21c depending on the direction in which the wheel base is arranged on the rail grid.

Figure 22:
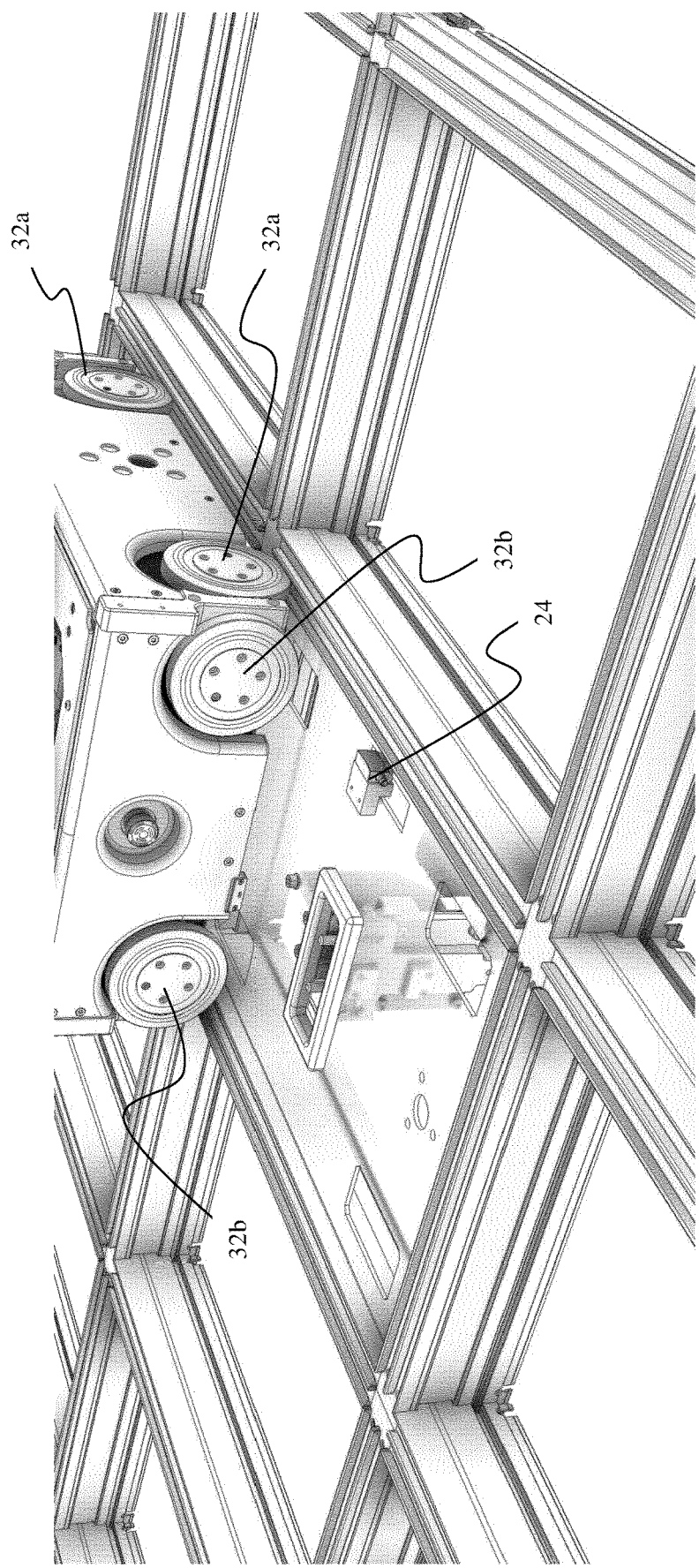
FIG. 22 is a perspective view of an exemplary container transfer vehicle entering a grid cell featuring a charging station.

In FIG. 22, the wheel base 36 is shown entering a grid cell 122' featuring a charging station 22 by moving the wheel base in the first direction. When moving in the first direction, the first set of wheels 32a is in the first position.

Figure 23:
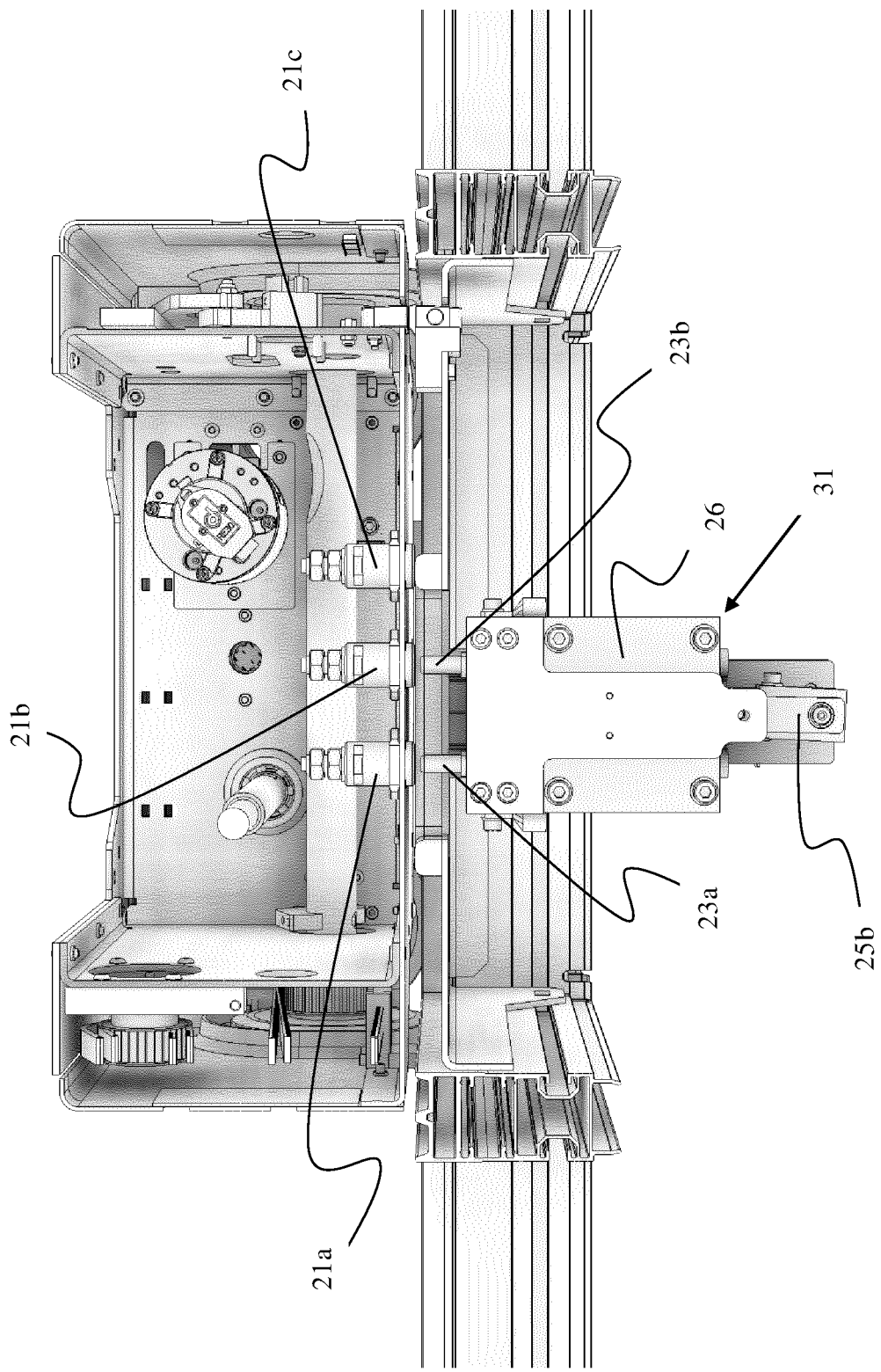
FIGS. 23 and 24 are sectional views of the charging station and the container transfer vehicle in FIG. 21.
Figure 24:
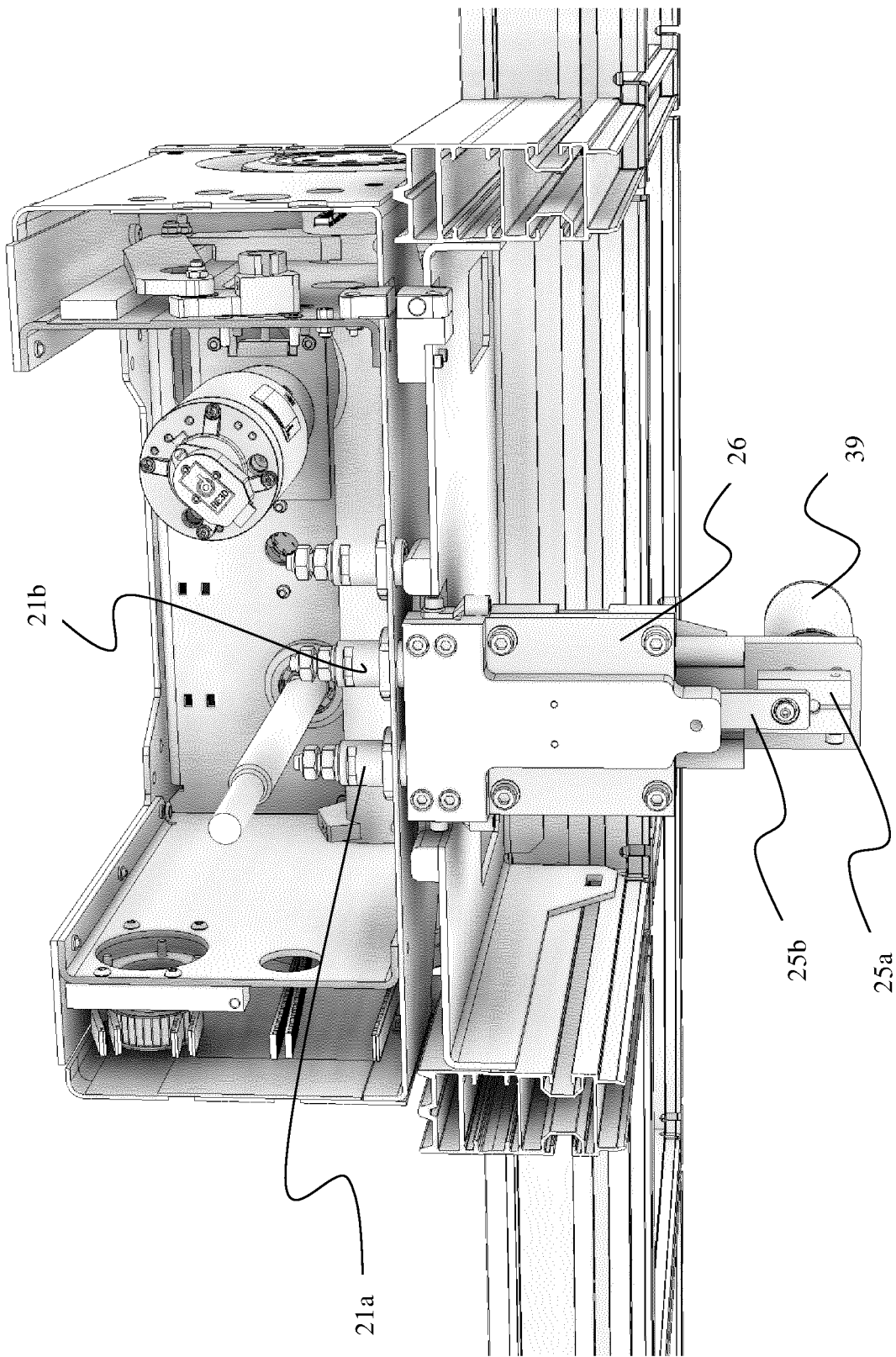

When the wheel base 36 is at a position above the charging station 22, see FIG. 23, the power sockets 21a-c are spaced from the power pins 23a-b. Two of the power sockets, the centrally arranged first power socket 21b and one of the other two power sockets 21a,21c depending on the direction of the wheel base 36 upon the transfer rail grid, are arranged directly above the power pins 23a,23b. Initially, the second set of wheels 32b is not in contact with the transfer rail grid 5. In this embodiment, the centrally arranged power socket 21b may be designed to receive a DC− current while the other two power sockets are designed to receive a DC+ current.

Before charging of the rechargeable battery 20 may be initiated, the first set of wheels 32a is moved vertically from the first position to the second position, in which the first and second sets of wheels 32a,32b are in contact with the rail grid 5. By having both sets of wheels 32a,32b in contact with the transfer rail grid 5, the positioning of the wheel base 36 relative to the charging station 22 is fixed. Rail grids are not always completely level, and by having the first set of wheels in the second position any unintended lateral movement of the wheel base is prevented. The actuator 31 is then operated such that the power pins 23a,23b are moved vertically upwards and into contact with the power sockets 21a,21b of the wheel base 36.

The inventive charging system allows for a higher charging capacity than the prior art horizontally arranged plug/socket connections since the contact area of the power sockets and power pins may be increased without introducing problems related to coupling/decoupling of the power pins and power sockets due to increased friction.

Figure 6:
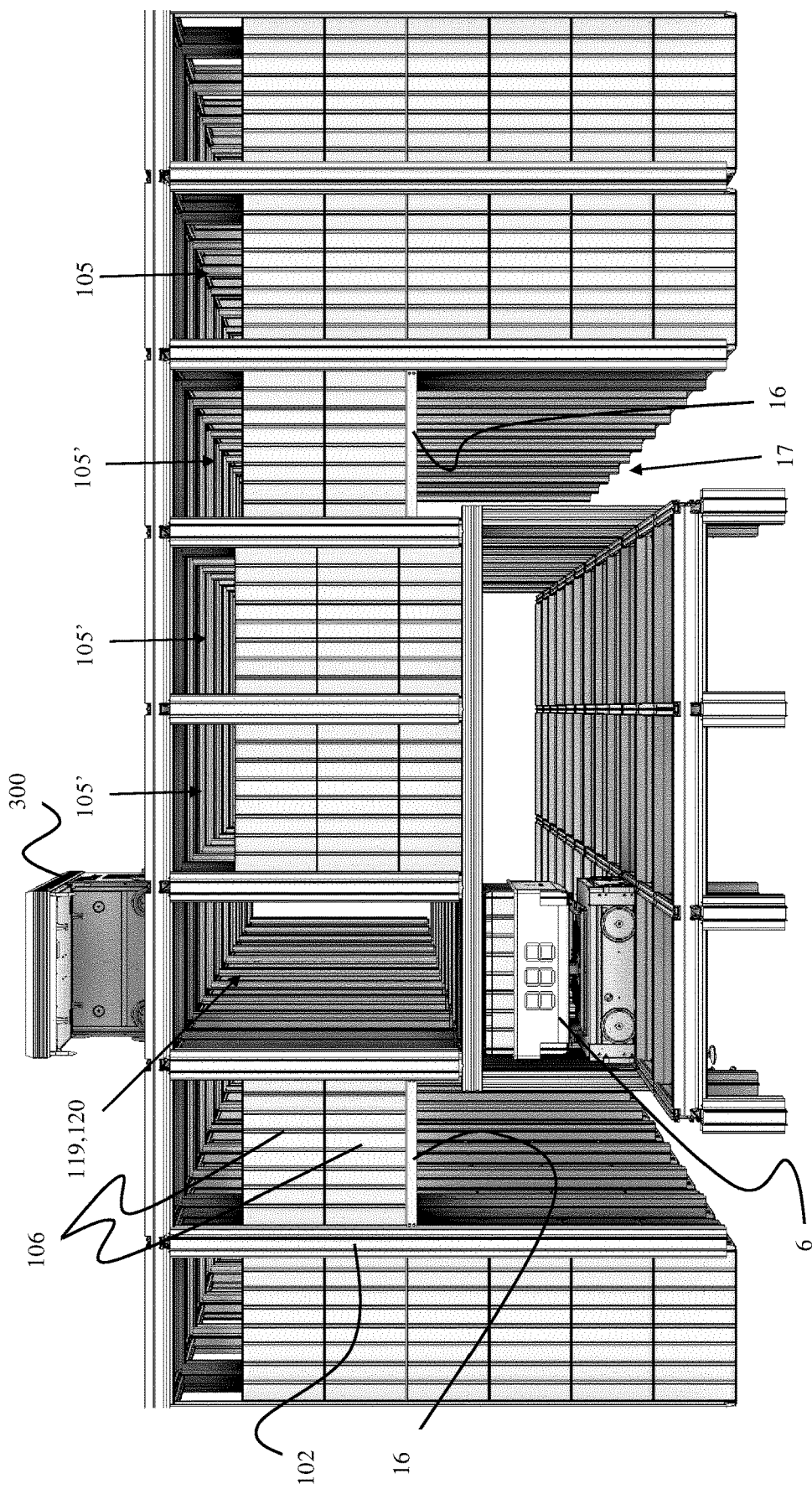
FIG. 6 is a perspective view of the storage grid in FIGS. 3 to 5, wherein the storage columns are stocked with storage containers.

When used in connection with container transfer vehicles 6, a charging station may advantageously be arranged such that a transfer vehicle is charged while positioned below a transfer column 119,120, see FIG. 6 (the charging station is not shown). In other words, the charging station may be arranged in a grid cell arranged directly below a transfer column. In this manner, the transfer vehicles may be utilized even more efficiently as they may be charged during operation.

The disclosed wheel base 36, and any container vehicle featuring a similar wheel base, comprises a rechargeable battery as a rechargeable power source. However, in other embodiments it is envisioned that the rechargeable power source may be any suitable power source that may be recharged by electric current, including a capacitor and similar.

In the disclosed embodiments, the power pins are arranged on the charging station and the power sockets are arranged on the container vehicle. This specific arrangement is advantageous in that debris or dust is prevented from entering the power socket due to its downwards facing arrangement. However, in further embodiments, an opposite arrangement is envisioned.

In the disclosed embodiments, the wheel base features two or three power sockets 21a-c and the charging station 22 features two corresponding power pins 23a,23b. However, in other embodiments the charging system interface may feature any suitable number of power sockets and cooperating power pins.

REFERENCE NUMERALS

1 Storage system
2 Transfer section
3 Horizontal ceiling profile
4 Vertical support profile
5 Transfer rail grid
6 Container transfer vehicle
7 Transfer vehicle path
8 Picking/stocking station
9 Container access opening
10 Rail circuit
11 First opening (in an external side of a storage grid)
12 An external side of a storage grid
13 Second opening (in an external side of a storage grid)
14 Rail circuit
15 Multi-use transfer grid area
16 Stopper element
17 Operator access passage
18 Support grid
19 Bottom section
20 Rechargeable battery, rechargeable power source
21a-c Power sockets (charge-receiving elements)
22 Charging station
23a,23b Power pins (charge-providing elements)
24 Positioning sensor
25a,25b Actuator arm assembly
26 Slide element
27 Charging plug/pin
28 Plate element (of support structure)
29 Support structure
30 Opening in plate element
31 Actuator
32a,32b Wheel arrangement
33 Charging power source
34 Electric wires
35 Electric wire connectors
36 Wheel base
37 Edge
38 Container carrier
39 Actuator motor
100 Framework structure
102 Upright members of framework structure, i.e. vertical column profiles
103 Horizontal members of framework structure
104 Storage grid, storage grid structure
105 Storage column
105' Storage column arranged above a transfer section
106 Storage container
107 Stack
108 Top rail grid, rail system
110 First set of parallel rails in first direction (X), top rails
111 Second set of parallel rails in second direction (Y), top rails
110' Transfer rails, in a first direction of a transfer rail grid
111' Transfer rails, in a second direction, perpendicular to the first direction, of a transfer rail grid
112 Grid column
115 Grid opening
119 Transfer column,
120 Transfer column
122 Grid cell
200 Prior art container-handling vehicle
201,301 Wheel arrangement
300 Second container-handling vehicle
X First direction
Y Second direction
Z Third direction

The invention claimed is:

1. A storage system comprising at least one vehicle, a horizontal rail grid, and a charging system for charging a rechargeable power source of the vehicle,
wherein the vehicle comprises a first set of wheels and a second set of wheels for moving the vehicle upon the rail grid;
wherein the first set of wheels is displaceable in a vertical direction between a first position, wherein the first set of wheels may move the vehicle in a first direction, a second position, wherein the first and the second set of wheels are in contact with the rail grid, and a third position, wherein the second set of wheels may move the vehicle in a second direction perpendicular to the first direction;
wherein the charging system comprises three charge-receiving elements arranged on a bottom section of the vehicle and connected to the power source, and a charging station comprising two charge-providing elements connected to a charging power source;

wherein the charging station comprises an actuator operatively connected to the charge-providing elements and arranged to move the charge-providing elements in a vertical direction, such that the charge-receiving elements may be connected with the charge-providing elements when the vehicle is positioned above the charging station;

wherein the charge-receiving elements comprise a first charge-receiving element centrally arranged on the bottom section and a second charge-receiving element and a third charge-receiving element arranged on opposite sides of the first charge-receiving element, such that the two charge-providing elements connect to the first charge-receiving element and one of the second and third charge-receiving elements depending upon an orientation in which the vehicle is arranged on the rail grid; and wherein each charge-receiving element is in a form of a power socket and each charge-providing element is in a form of a power pin.

2. The storage system according to claim 1, wherein the actuator is arranged to move the charge-providing elements between a first position in which the charge-receiving elements and the charge-providing elements may be connected and a second position in which the charge-receiving elements and the charge-providing elements are separated.

3. The storage system according to claim 2, wherein the charge-receiving elements and the charge-providing elements are connected when the vehicle is positioned above the charging station, and the charge-providing elements are in the first position.

4. The storage system according to claim 2, wherein the actuator is arranged such that an upper level of the charge-providing elements is at or below an upper level of the rail grid when the charge-providing elements are in the second position and above the upper level of the rail grid when the charge-providing elements are in the first position.

5. The storage system according to claim 2, wherein the charge-receiving elements and the charge-providing elements are connected when the vehicle is positioned above the charging station, and the charge-providing elements are in the first position and the first set of wheels is in the first or second position.

6. The storage system according to claim 1, wherein the three charge-receiving elements are arranged in a line along the first or second direction.

7. The storage system according to claim 1, wherein the actuator is operably connected to the power pins and arranged to move the power pins in a vertical direction between an upper first position and a lower second position.

8. The storage system according to claim 7, further comprising a support structure, the support structure comprising a horizontal plate element having an opening arranged such that the power pins will extend above an upper edge of the opening when in the upper first position and below, or at a level of, the edge when in the lower second position.

9. The storage system according to claim 7, wherein the actuator comprises an electric motor, an actuator arm assembly, and a vertically arranged slide element to which the power pins are connected, the actuator arm assembly is operatively connected between the electric motor and the slide element, such that rotation of the motor may move the power pins between the upper first position and the lower second position.

10. A method of charging a vehicle in a storage system, the storage system comprising a horizontal rail grid and a charging system for charging a rechargeable power source of the vehicle, wherein the vehicle comprises a first set of wheels and a second set of wheels for moving the vehicle upon the rail grid;

wherein the first set of wheels is displaceable in a vertical direction between a first position, wherein the first set of wheels may move the vehicle in a first direction, a second position, wherein the first and the second set of wheels are in contact with the rail grid, and a third position, wherein the second set of wheels may move the vehicle in a second direction perpendicular to the first direction;

wherein the charging system comprises three charge-receiving elements arranged on a bottom section of the vehicle and connected to the power source, and a charging station comprising two charge-providing elements connected to a charging power source;

wherein the charging station comprises an actuator operatively connected to the charge-providing elements and arranged to move the charge-providing elements in a vertical direction;

wherein the charge-receiving elements comprise a first charge-receiving element centrally arranged on the bottom section and a second charge-receiving element and a third charge-receiving element arranged on opposite sides of the first charge-receiving element, such that the two charge-providing elements connect to the first charge-receiving element and one of the second and third charge-receiving elements depending upon an orientation in which the vehicle is arranged on the rail grid;

wherein each charge-receiving element is in a form of a power socket and each charge-providing element is in a form of a power pin; and wherein the method comprises:
moving the vehicle in the first direction towards the charging station;
stopping the vehicle in a position above the charge-providing elements; and
moving the charge-providing elements in a vertical direction, such that the charge-receiving elements and the charge-providing elements are connected.

11. The method according to claim 10, wherein moving the charge-providing elements in a vertical direction is preceded by:
displacing the first set of wheels from the first position to the second position such that horizontal movement of the vehicle is prevented.

* * * * *